Feb. 7, 1933.                N. DEISCH                1,896,885
APPARATUS FOR CORRECTING VARIABLE CONDENSERS
Filed Sept. 5, 1931          19 Sheets-Sheet 1

Inventor
Noel Deisch
By Ritter, Mechlin & O'Neill
Attorneys

Feb. 7, 1933.　　　　　N. DEISCH　　　　　1,896,885
APPARATUS FOR CORRECTING VARIABLE CONDENSERS
Filed Sept. 5, 1931　　19 Sheets-Sheet 2

Inventor
Noel Deisch
By Ritter, Mechlin & O'Neill
Attorneys

Feb. 7, 1933.  N. DEISCH  1,896,885
APPARATUS FOR CORRECTING VARIABLE CONDENSERS
Filed Sept. 5, 1931  19 Sheets-Sheet 5
FIG. 9
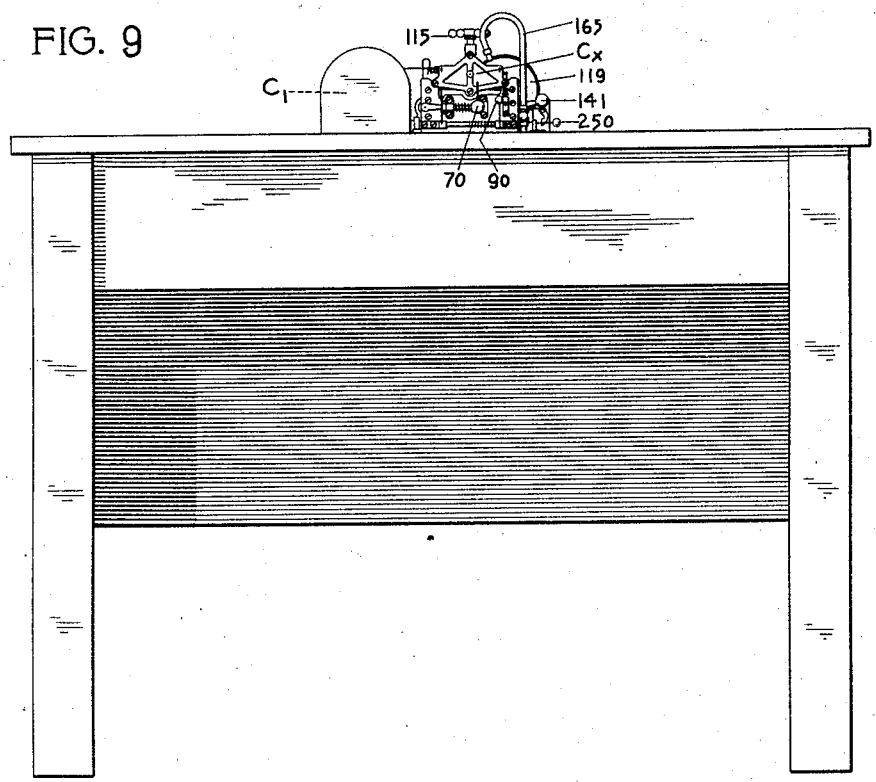
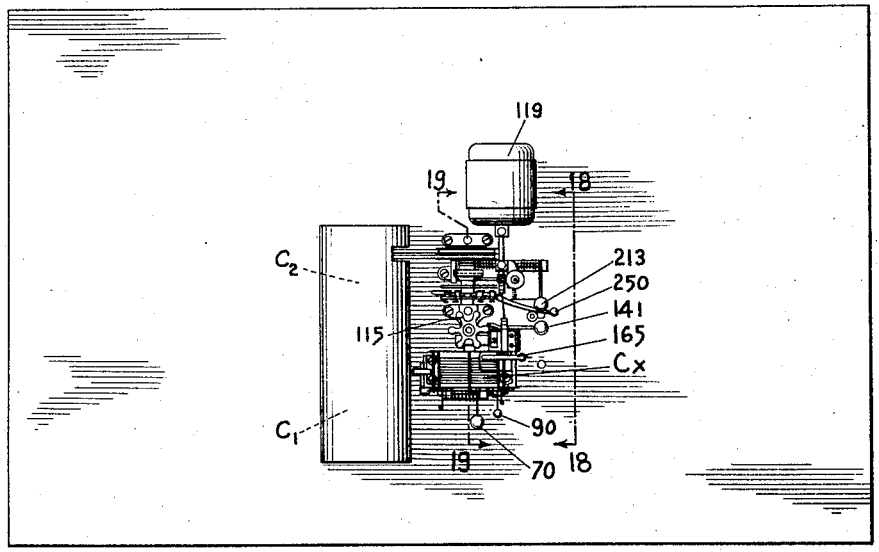
FIG. 9A
Noel Deisch Inventor Feb. 7, 1933. N. DEISCH 1,896,885
APPARATUS FOR CORRECTING VARIABLE CONDENSERS
Filed Sept. 5, 1931 19 Sheets-Sheet 6

Noel Deisch, Inventor

Feb. 7, 1933.　　　　N. DEISCH　　　　1,896,885
APPARATUS FOR CORRECTING VARIABLE CONDENSERS
Filed Sept. 5, 1931　　19 Sheets-Sheet 7

Noel Deisch Inventor

Feb. 7, 1933.  N. DEISCH  1,896,885
APPARATUS FOR CORRECTING VARIABLE CONDENSERS
Filed Sept. 5, 1931  19 Sheets-Sheet 12
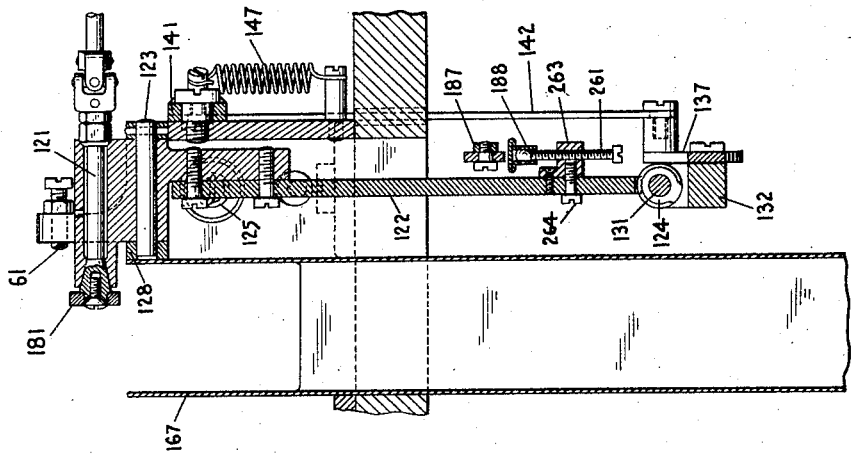
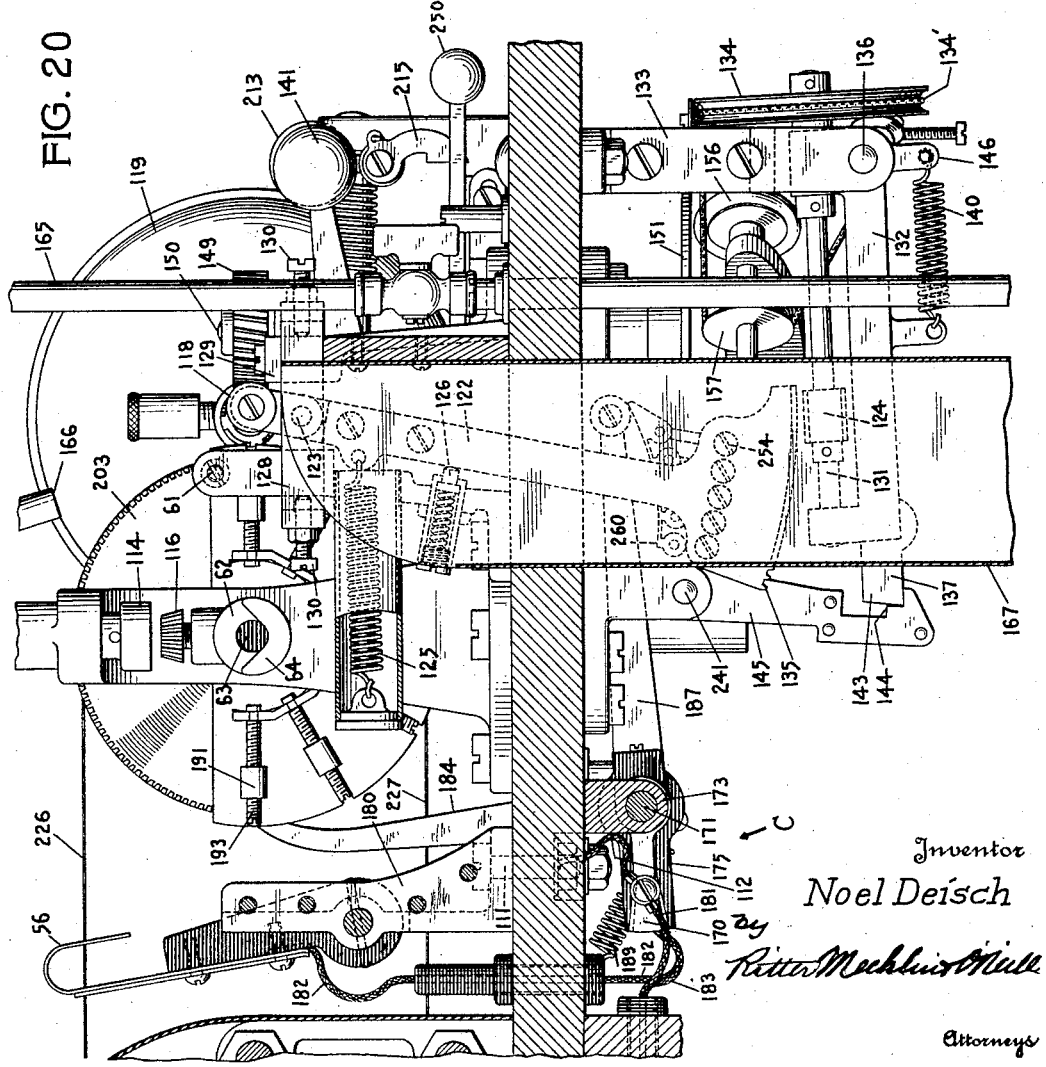
Inventor
Noel Deisch
by
Ritter Mechlin & Miell
Attorneys

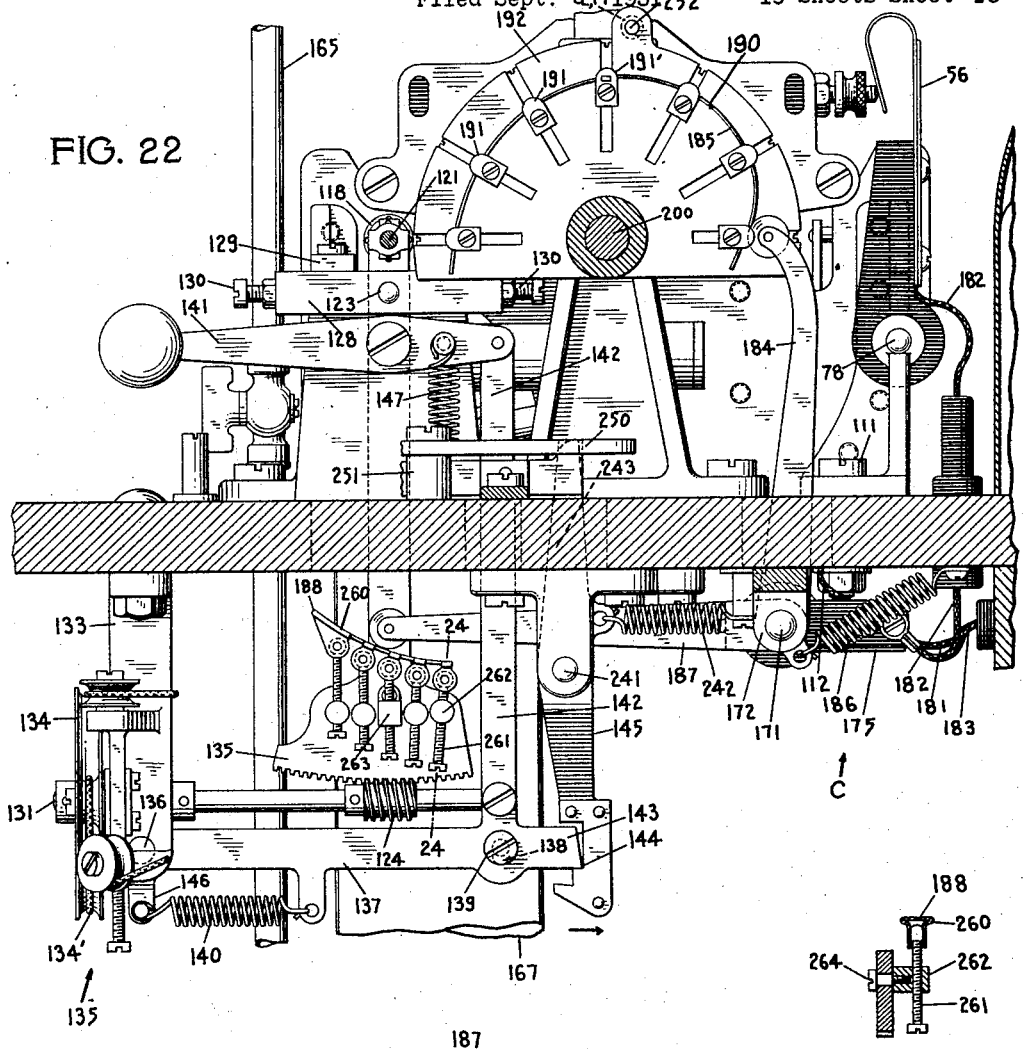

Feb. 7, 1933.                N. DEISCH                1,896,885
APPARATUS FOR CORRECTING VARIABLE CONDENSERS
Filed Sept. 5, 1931       19 Sheets-Sheet 14

Inventor
Noel Deisch
By Rotter, Muchlin & O'Neill
Attorneys

Inventor
Noel Deisch

Feb. 7, 1933.   N. DEISCH   1,896,885
APPARATUS FOR CORRECTING VARIABLE CONDENSERS
Filed Sept. 5, 1931   19 Sheets-Sheet 16
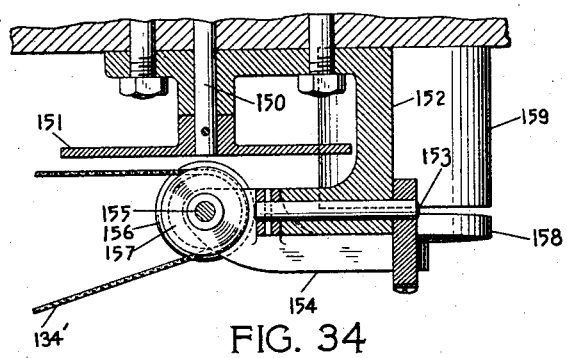
FIG. 34
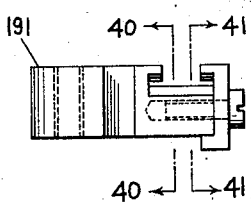
FIG. 38
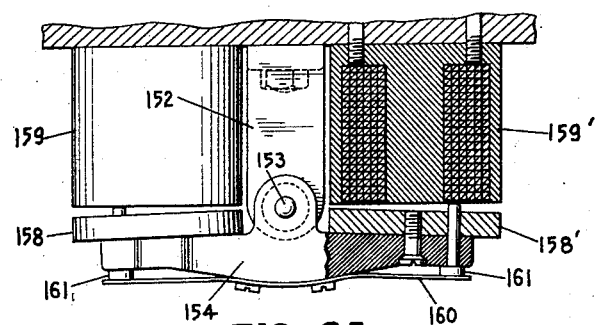
FIG. 35
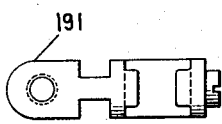
FIG. 39
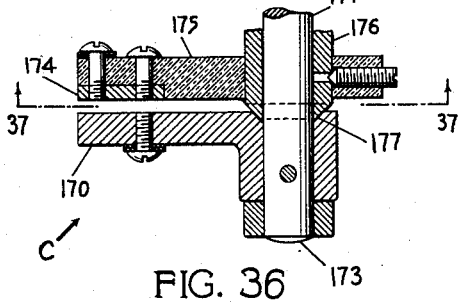
FIG. 36
FIG. 40   FIG. 41
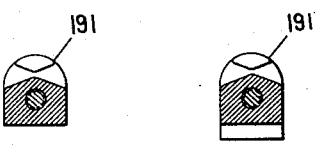
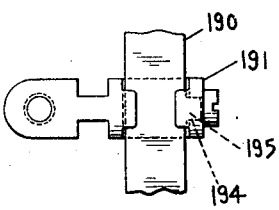
FIG. 42
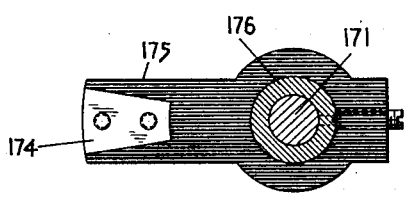
FIG. 37
Inventor
Noel Deisch
By Ritter, Mechlin & O'Neill
Attorneys Feb. 7, 1933.   N. DEISCH   1,896,885
APPARATUS FOR CORRECTING VARIABLE CONDENSERS
Filed Sept. 5, 1931   19 Sheets-Sheet 17

Inventor
Noel Deisch
By Ritter, Mechlin & O'Neill
Attorneys

Feb. 7, 1933.  N. DEISCH  1,896,885
APPARATUS FOR CORRECTING VARIABLE CONDENSERS
Filed Sept. 5, 1931   19 Sheets-Sheet 18
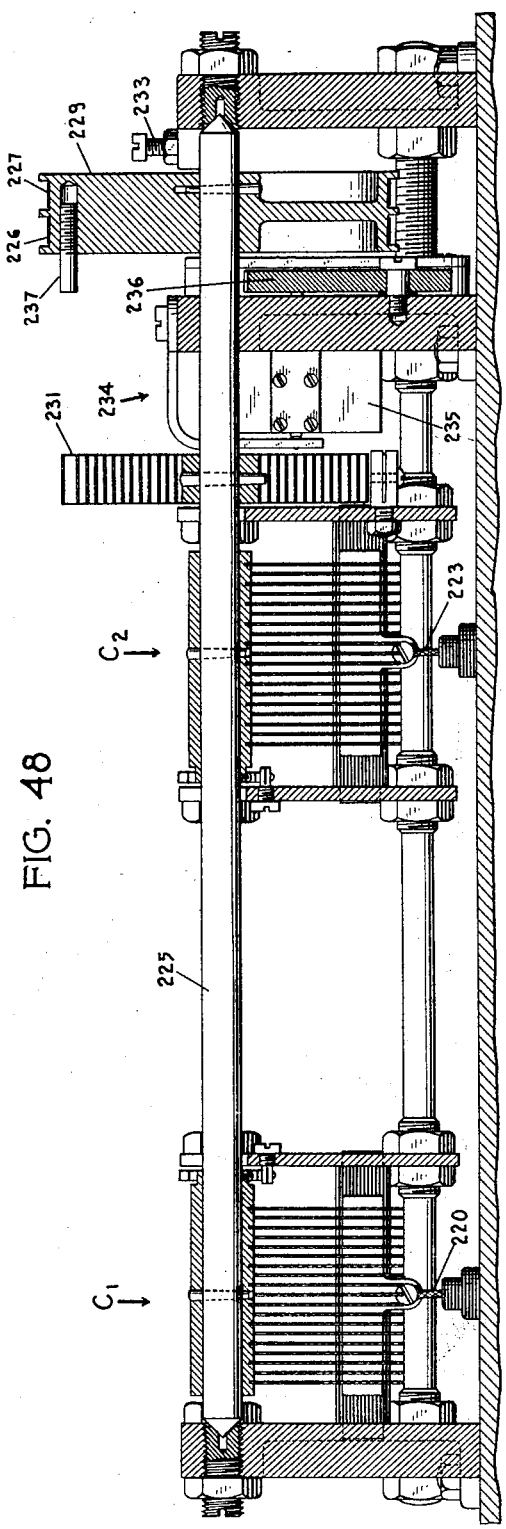
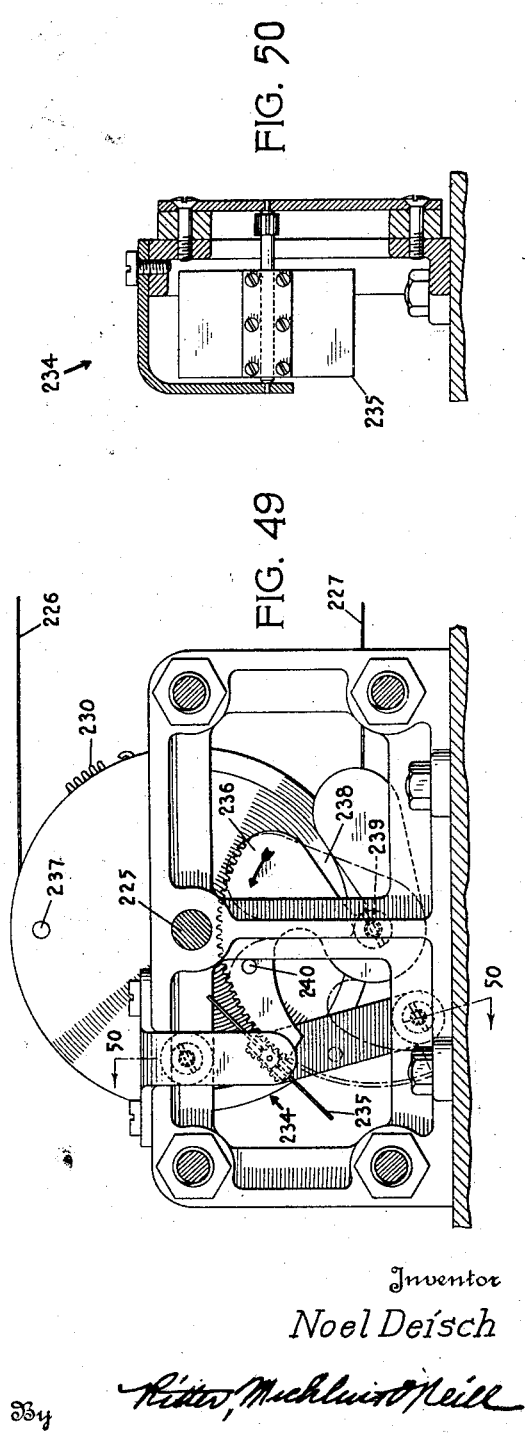
Inventor
Noel Deisch Feb. 7, 1933.  N. DEISCH  1,896,885
APPARATUS FOR CORRECTING VARIABLE CONDENSERS
Filed Sept. 5, 1931  19 Sheets-Sheet 19

Inventor
Noel Deisch

Attorneys

Patented Feb. 7, 1933

1,896,885

UNITED STATES PATENT OFFICE

NOEL DEISCH, OF WASHINGTON, DISTRICT OF COLUMBIA

APPARATUS FOR CORRECTING VARIABLE CONDENSERS

Application filed September 5, 1931. Serial No. 561,490.

The invention relates to a machine for correcting capacity aberrations in condensers by removing zonal sections of rotor elements of variable condensers to bring the capacities of said condensers to a predetermined and uniform value for their various capacity settings, the correctional operations being effected by a cutting tool controlled and operated by electromechanical means, including means for connecting the condenser in an oscillating circuit inductively coupled with a receptor circuit, which includes a standard condenser and a relay circuit responsive to current changes in the receptor circuit, effected by variations in the frequency of the oscillating circuit, from that of the receptor circuit, the relay circuit including means for effectively engaging the tool with the work when said relay circuit is energized; the machine also including an auxiliary condenser in parallel with the condenser to be corrected and adjustable to compensate capacity disturbing effects of the cutter and also capacity aberrations of the condenser being operated upon, due to change from its correctional to its final environment.

A typical machine involving the aforesaid fundamental structural and operative features, together with various other details, is illustrated in the accompanying drawings, in which:—

Fig. 9 is a reduced front elevational view of the machine for trimming a condenser blade to correct the capacity aberrations of a condenser as installed in its cabinet.

Fig. 9A is a top plan view of Fig. 9.

Figure 11:
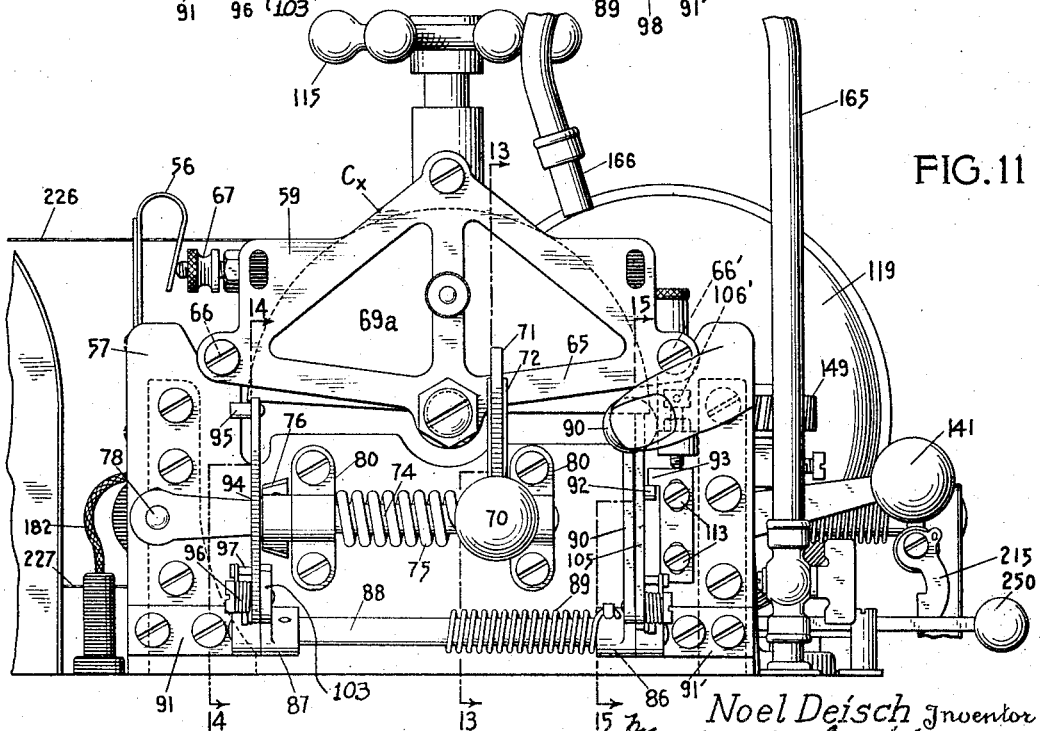
Fig. 11 is a view similar to Fig. 10 but showing the condenser in place and the rotor positioning lever depressed.
Figures 14A, 14B, 14C:
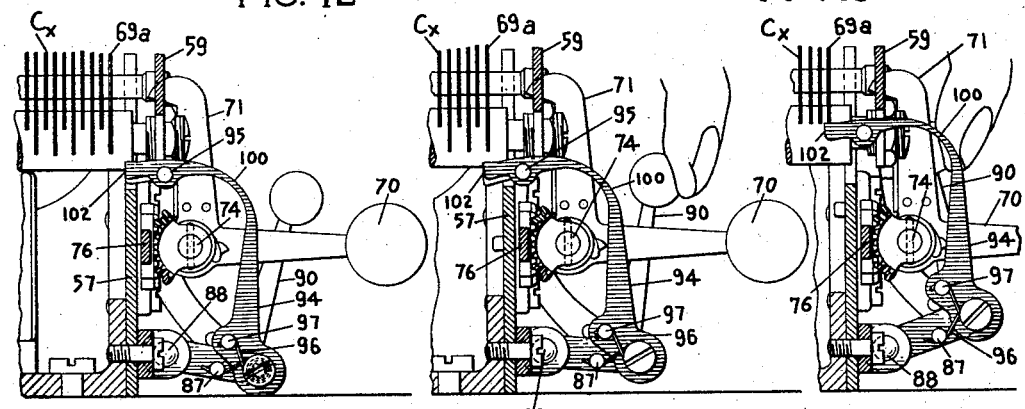

Figs. 14a, 14b, and 14c are fragmentary sectional views taken on the line 14—14 of Fig. 11, and show one of the condenser rotor positioning claws in three consecutive positions.

Figures 15A, 15B, 15C:
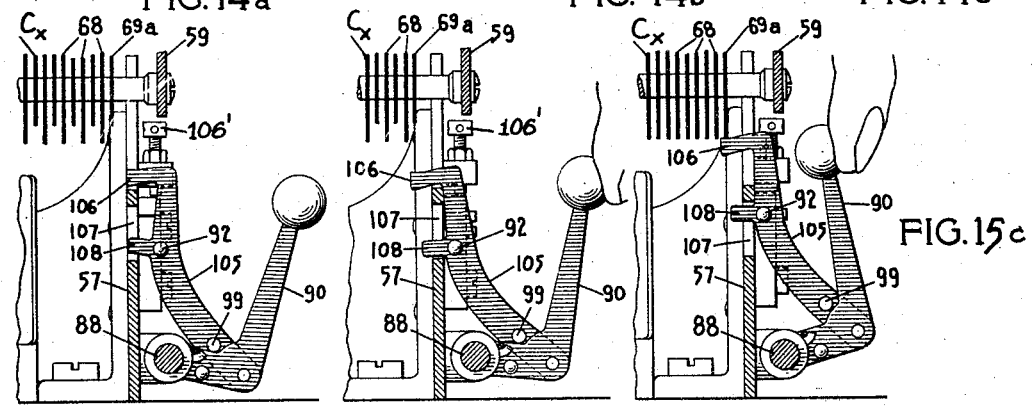

Figs. 15a, 15b, and 15c are fragmentary sectional views taken on the line 15—15 of Fig. 11, and show another of the condenser rotor positioning claws in three consecutive positions.

Figure 16:
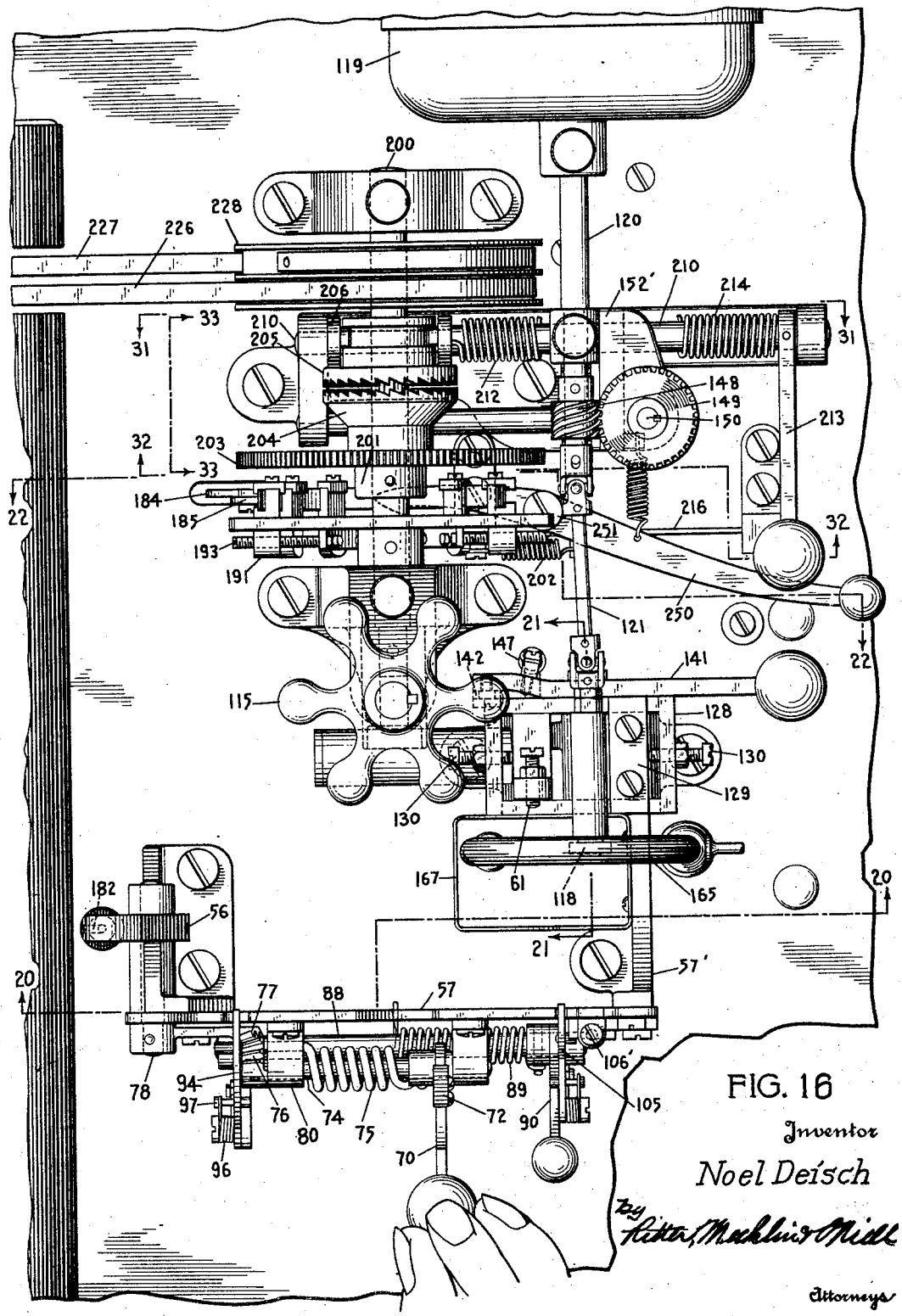

Fig. 16 is a fragmentary top plan view showing the apparatus in position to receive a condenser.

Figure 17:
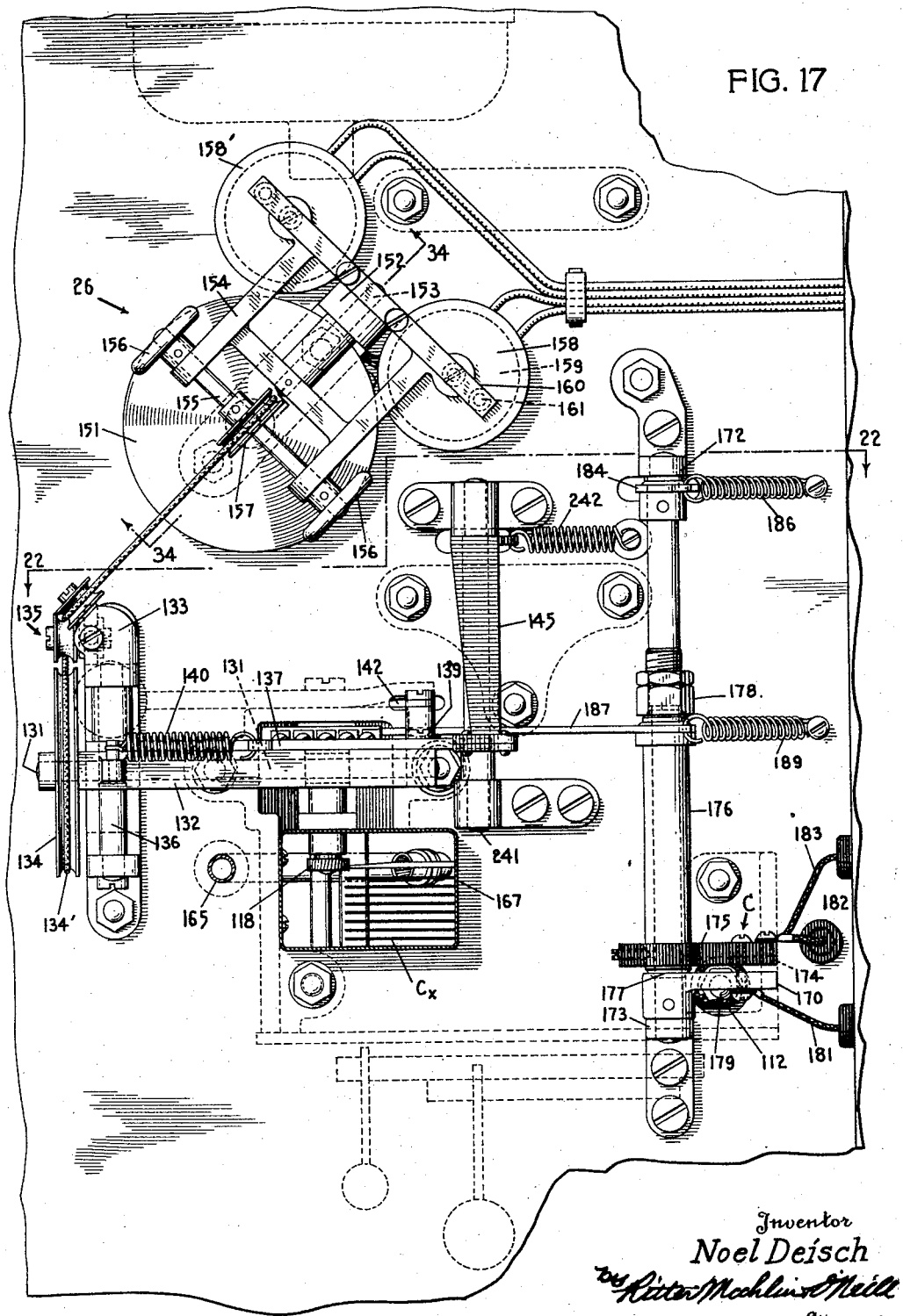

Fig. 17 is a fragmental bottom plan view of portions of the apparatus, the suction tube being shown in horizontal section.

Figure 18:
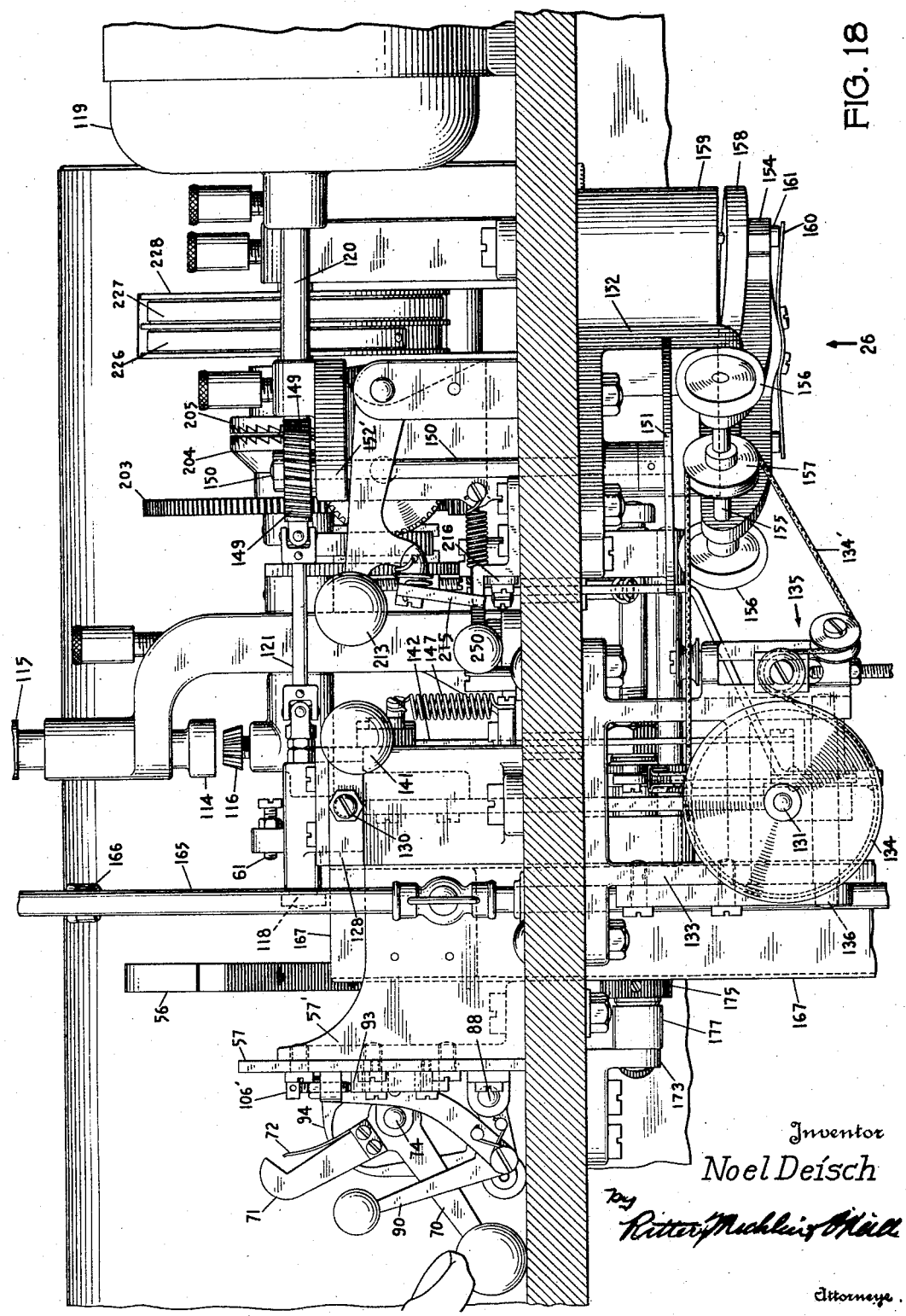

Fig. 18 is a fragmentary sectional view taken on the line 18—18 of Fig. 9A showing in side elevation portions of the apparatus above and below the base board, the parts being in the position which they assume prior to a condenser being put in position for the cutting operation.

Figure 19:
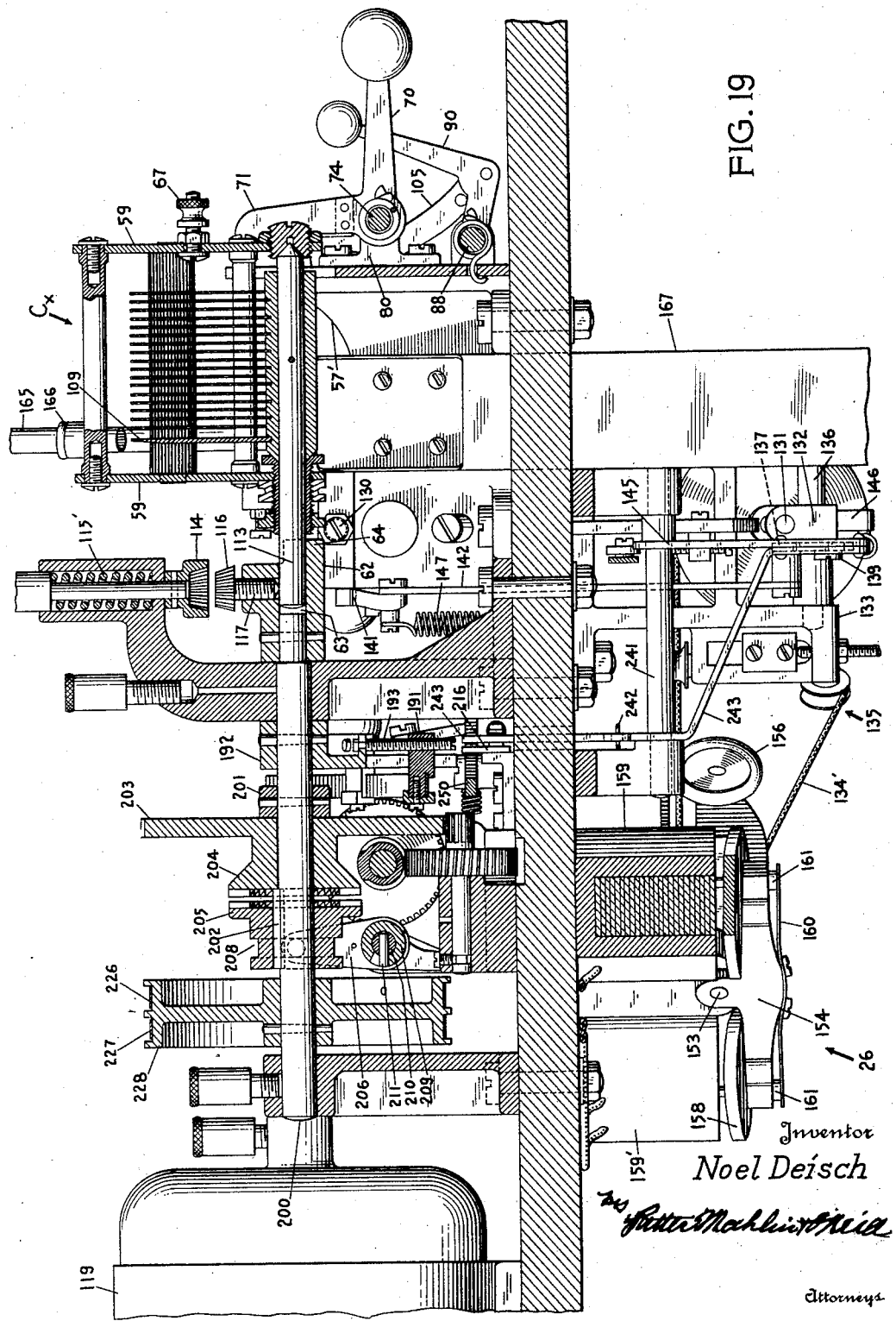

Fig. 19 is a longitudinal vertical sectional view taken on the line 19—19 of Fig. 9A, the parts being in the position which they assume after the process of trimming a condenser blade has been completed.

Fig. 20 is a section taken mainly on the line 20—20 of Fig. 16 but having additional parts in fragmentary section, and shows the components of the apparatus in the position which they assume prior to a condenser being adjusted in place.

Fig. 21 is a fragmentary detail section taken on the line 21—21 of Fig. 16 and shows especially the method of mounting the cutter wheel and cutter wheel operating arm.

Fig. 22 is a fragmentary sectional view of portions of the apparatus, the portion above the base board being taken on the line 22—22 of Fig. 16, and the portion below the base board being taken on the line 22—22 of Fig. 17, the parts being in the position which they assume in the initial period of the trimming operation.

Fig. 23 is a fragmentary section corresponding to Fig. 22, but showing some of the parts in a different position.

Fig. 24 is a detail section on line 24—24 of Fig. 22.

Figure 25:
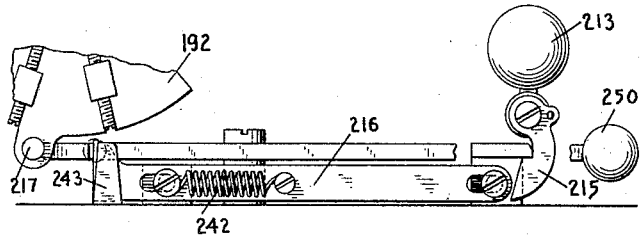

Fig. 25 is a fragmentary front elevational detail view of portions of the trip mechanism, the position of the parts being that which they assume before the tripping action has taken place.

Figure 26:
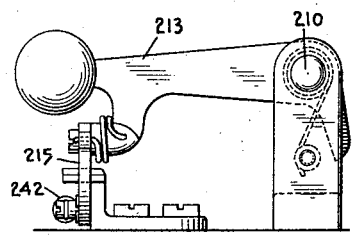

Fig. 26 is a side elevational detail view of parts shown in Fig. 25 and of some additional parts, the operative positions being the same as those of Fig. 25.

Figure 27:
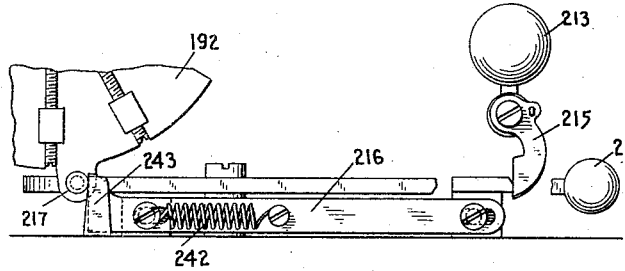

Fig. 27 is a view corresponding to Fig. 25 showing the parts in the position which they assume after the tripping action has taken place.

Figure 28:
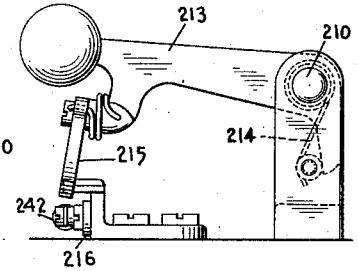

Fig. 28 is a view corresponding to Fig. 26, the operative position of the parts corresponding to Fig. 27.

Figure 29:
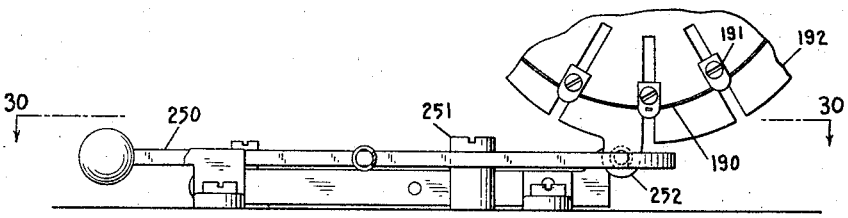

Fig. 29 is a detail view showing especially the release mechanism controlling the action of the main shaft and attached parts.

Figure 30:
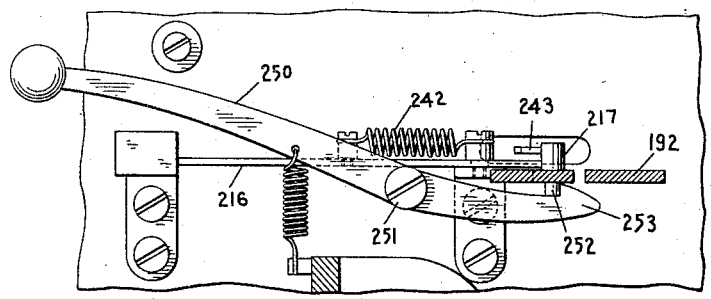

Fig. 30 is a detail sectional view taken on the line 30—30 of Fig. 29.

Figure 31:
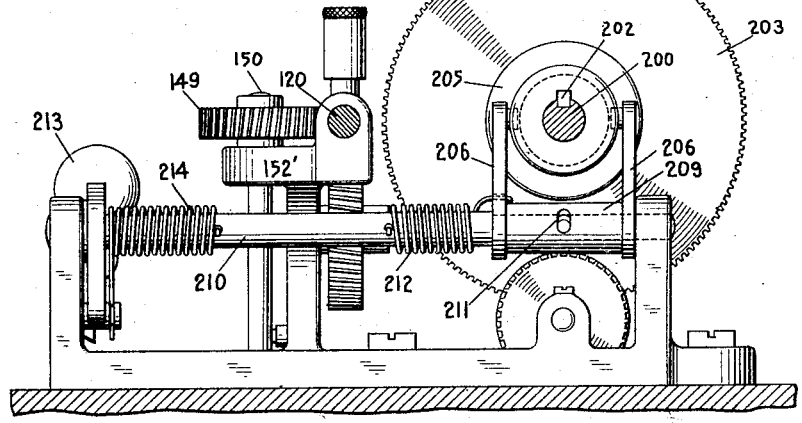

Fig. 31 is a detail sectional view taken on the line 31—31 of Fig. 16, and shows especially the main shaft driving and clutch operating mechanism.

Figure 32:
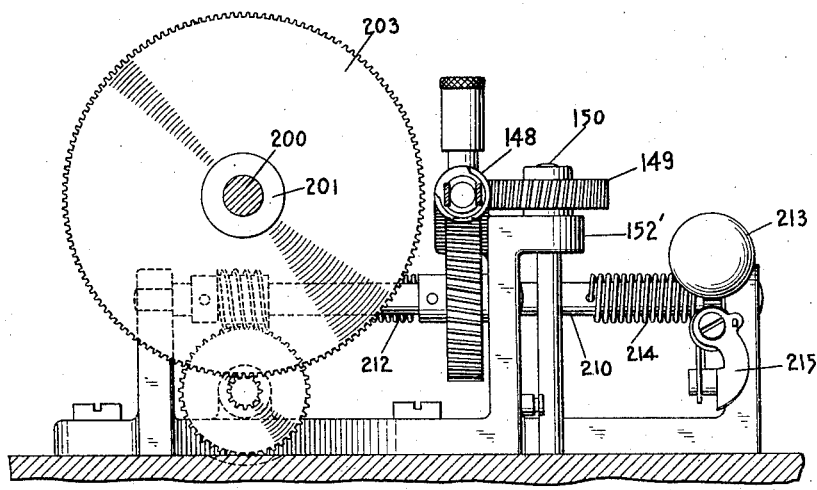

Fig. 32 is a detail sectional view taken on the line 32—32 of Fig. 16, and shows especially the gear train by which the main shaft is driven from the motor shaft.

Figure 33:
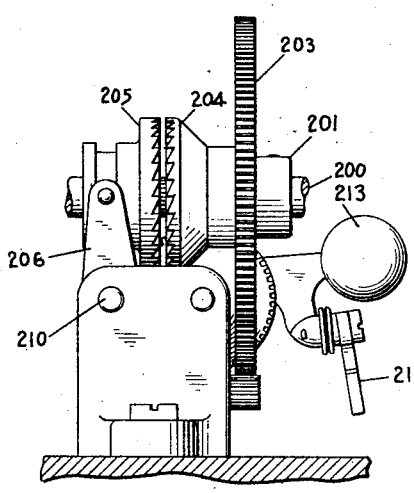

Fig. 33 is a detail sectional view taken on the line 33—33 of Fig. 16.

Fig. 34 is a longitudinal sectional detail view of the electromechanical relay taken on the line 34—34 of Fig. 17.

Fig. 35 is a rear elevational view of the electromechanical relay having some parts in fragmentary section.

Fig. 36 is an enlarged fragmentary horizontal sectional detail view of portions of the compensating condenser.

Fig. 37 is a section taken on the line 37—37 of Fig. 36.

Fig. 38 is an enlarged side elevational view of one of the compensating condenser main cam adjusting blocks.

Fig. 39 is a top plan view of the structure shown in Fig. 38.

Fig. 40 is a section taken on the line 40—40 of Fig. 38.

Fig. 41 is a section on the line 41—41 of Fig. 38.

Fig. 42 is a top elevational view of the middle adjusting block for the main cam for operating the compensating condenser.

Figure 43:
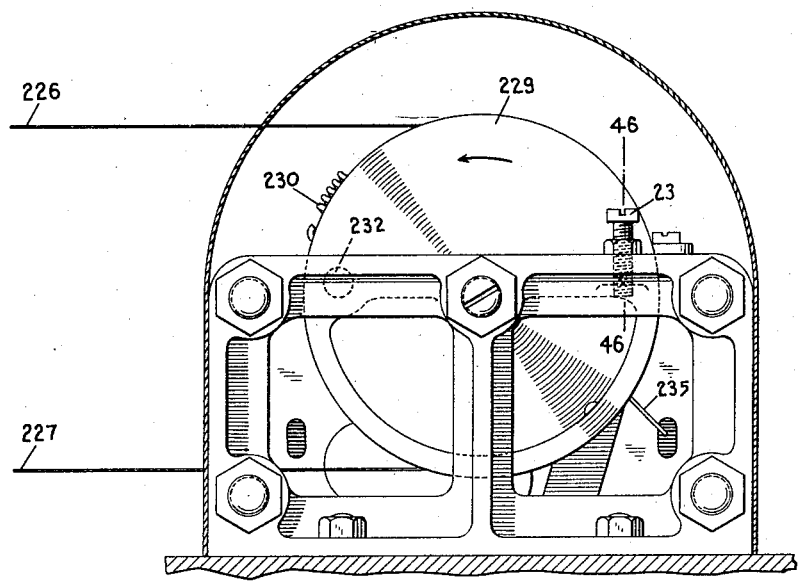
Figures 51, 52, 53:
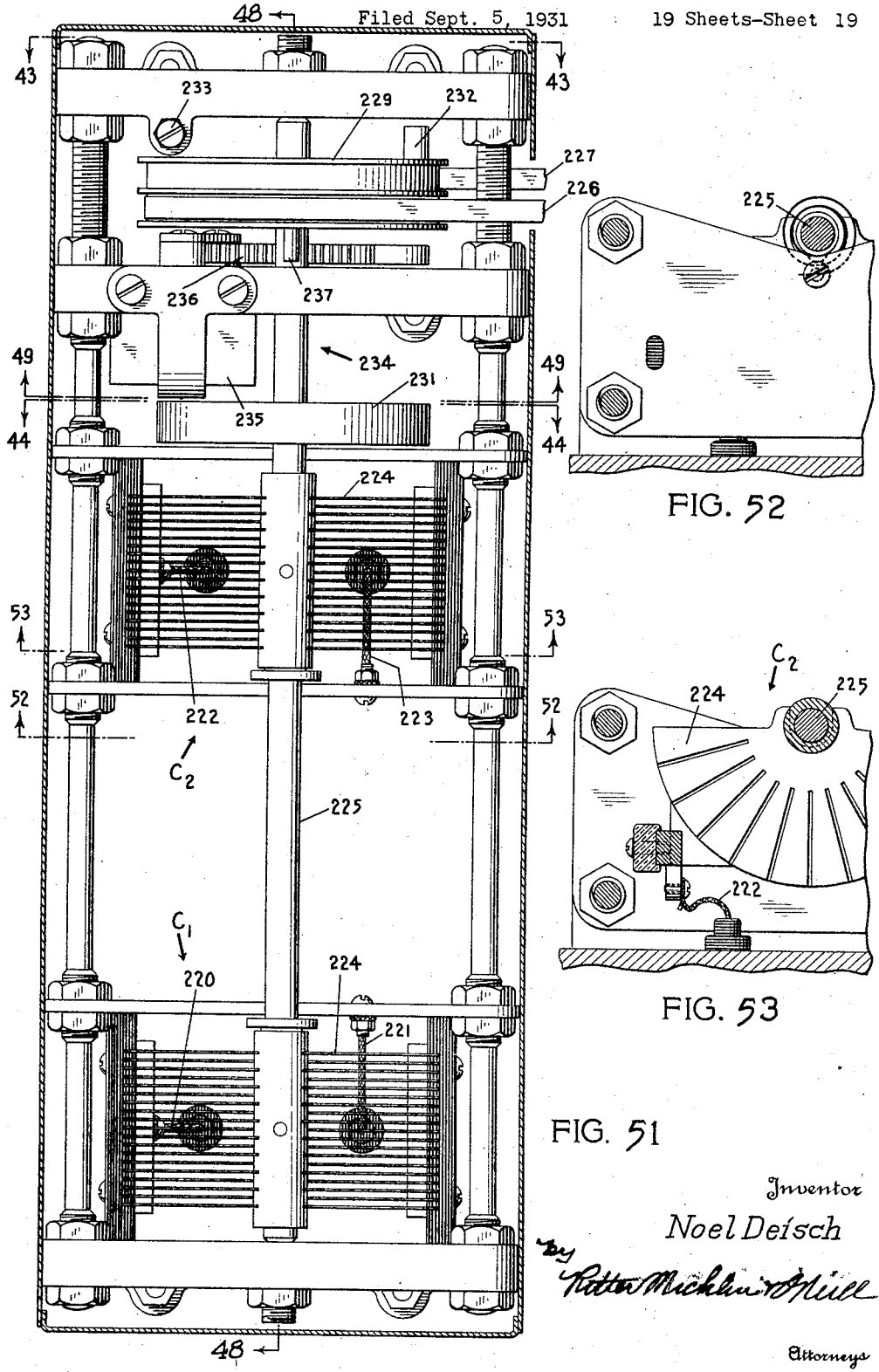

Fig. 43 is a detail sectional view of the standardized condenser assembly taken on the line 43—43 of Fig. 51, and shows especially the pulley and stop mechanism in rear elevation.

Figure 44:
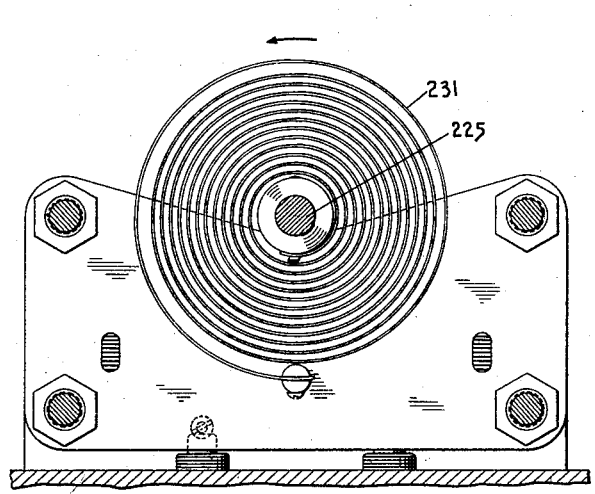

Fig. 44 is a section taken on the line 44—44 of Fig. 51, and shows especially the spiral driving spring in rear elevation.

Figure 45:
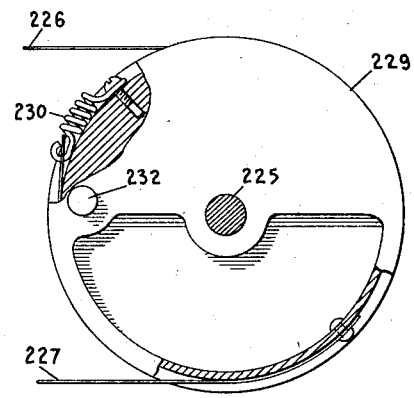

Fig. 45 is a detail rear elevational view of the standardized condenser operating pulley, some parts being in section to show the method of anchoring the belts.

Figure 46:
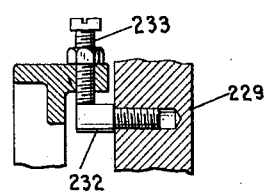

Fig. 46 is a detail sectional view of the condenser rotor stop mechanism taken on the line 46—46 of Fig. 43, the stop pin and adjustable stop being shown in abutting relation.

Figure 47:
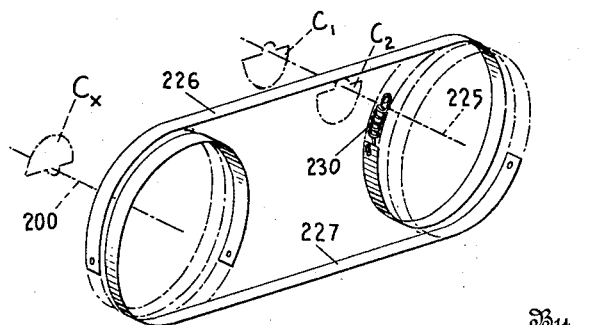

Fig. 47 is a diagram on a reduced scale showing the manner in which the belts connecting the main shaft and the standardized condenser shaft are attached to their pulleys.

Fig. 48 is a longitudinal vertical sectional view of the standardized condenser assembly taken on the line 48—48 of Fig. 51, with the condenser housing removed.

Fig. 49 is a transverse sectional view taken on the line 49—49 of Fig. 51, the condenser housing being removed, and shows especially the standardized condenser rotor retarding mechanism.

Fig. 50 is a detail sectional view taken on the line 50—50 of Fig. 49, and shows especially the mounting of the fly of the standardized condenser rotor retarding mechanism.

Fig. 51 is a top plan view of the standardized condenser assembly, the condenser housing being shown in horizontal section.

Fig. 52 is a detail section taken on the line 52—52 of Fig. 51 and shows especially one of the stator supporting end plates.

Fig. 53 is a detail section taken on the line 53—53 of Fig. 51, and shows especially the presetting rotor plate and the method of attachment of the stator.

It is usually required that the variable condensers, by which tuning of the circuits of radio apparatus is effected, should possess a capacity characteristic of some predetermined form or value. Condensers made by production methods, however, commonly show a more or less marked departure from this desired characteristic, the amount of the departure depending chiefly on the closeness of the manufacturing tolerances governing the plane-parallelism and spacing of the condenser plates. The requirements as respects allowable departure from the desired capacity at a given capacity setting in the condensers used in modern multi-tuned circuits are usually so stringent that an adherence to tolerances close enough to ensure this accuracy by ordinary manufacturing methods would result in a product of prohibitive cost.

The machine to be described provides for the automatic reformation of the capacity characteristic of the condenser after the condenser has been assembled, the required corrections being secured by cutting away zonal portions of one of the rotor plates of the condenser in such amount at different capacity settings or angles of overlap as to give the corrections required.

Figure 3:
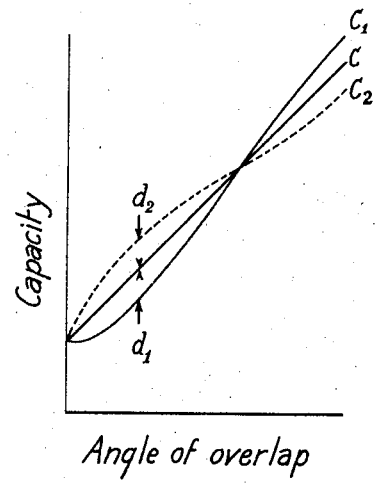
Fig. 3 is a diagram showing the nature of the correction required at any given capacity setting of a condenser to achieve a correction of the capacity characteristic at that setting.

If the capacity characteristics of a variable condenser be plotted, capacity, $C$, being shown as ordinates and the angle of overlap, $\theta$, as abscissæ, a more or less irregular curve such as that shown at $C_1$ in Fig. 3 may be obtained. This curve, which may be assumed to represent the capacity characteristic which a condenser made according to the usual manufacturing methods exhibits after assembly, is hereafter referred to as the primary condenser curve. The characteristic which it is required that the finished condenser should possess may be assumed to be of the form shown at $C$. This latter curve is hereafter referred to as the desired capacity curve. The ordinal differences $d_1$ of these two curves at different capacity settings represent the capacity aberrations of the condenser at those settings.

To correct the capacity curve $C_1$ and bring it into coincidence with the curve $C$, the condenser plate must be reshaped in such a way that for any capacity setting an increment of capacity $d_2$ equal to $d_1$, but of opposite sign will be added to or subtracted from the primary capacity of the condenser at the corresponding setting. By plotting values of $d_2$ as ordinates with reference to $C$, a curve $C_2$ is had which represents the inverse with respect to $C$ of the curve $C_1$. This curve is referred to as the capacity correction curve.

Assuming capacity to vary directly with the area of overlap, the capacity of a condenser with pivotally moving blades of variable radius for any degree of overlap may be stated to be, $$C = \frac{1}{2} K \int_{\theta_1}^{\theta_2} \rho^2 d\theta$$

where $C$ represents capacity, $K$ a constant whose value depends on the thickness and specific inductive capacity of the dielectric, $\theta$ the angle of overlap expressed in radians, and $\rho$ the radius of the plate at any particular value of $\theta$.

Solving for $\rho$ by taking the first derivative with respect to $\theta$ of the above equation for both the primary capacity curve and the capacity correction curve, we have, For characteristic C $$\frac{dC}{d\theta} = \frac{1}{2} K \rho^2$$

$$\rho^2 = \frac{2}{K} \frac{dC}{d\theta}$$

$$\rho = \sqrt{\frac{2}{K} \frac{dC}{d\theta}}$$

$$\rho = M \sqrt{\frac{dC}{d\theta}}$$

For characteristic $C_2$ $$\frac{dC_2}{d\theta} = \frac{1}{2} K \rho_2^2$$

$$\rho_2^2 = \frac{2}{K} \frac{dC_2}{d\theta}$$

$$\rho_2 = \sqrt{\frac{2}{K} \frac{dC_2}{d\theta}}$$

$$\rho_2 = M \sqrt{\frac{dC_2}{d\theta}}$$

where $$M = \sqrt{\frac{2}{K}}.$$

Figure 4:
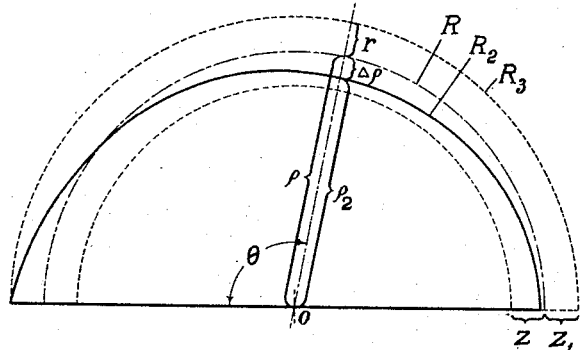
Fig. 4 is a diagram illustrating the relations involved in the method of reforming the contour of a condenser blade to correct capacity aberrations of the condenser.

The plot of the resulting curves may be as shown in Fig. 4, where $R$ denotes the curve corresponding to $C$ of Fig. 3 and $R_2$ denotes the curve corresponding to $C_2$. $R_2$ determines the form that must be given the plates of a condenser originally having semi-circular plates of radius $\rho$ and producing an initial capacity curve similar to $C_1$ of Fig. 3 in order that this condenser may be made to have the capacity curve shown at $C$. This curve is hereafter referred to as the plate correction curve. It represents the first derivative of the curve $C_2$ of Fig. 3 changed from rectangular to polar coordinates, the radii vectors of the curve $R_2$ being proportional to the square root of the first derivative of the polar capacity curve. Since $\rho$ describes areas both above and below $R$, it is indicated that corresponding areas must be added to or cut away from the condenser blade as originally made to correct the primary capacity curve and to bring it into coincidence with the desired capacity curve. Referring the correction curve $R_2$ to $R$ as a norm, we have for the deviation of $R_2$ from $R$ at any setting, $$\Delta\rho = M\left(\sqrt{\frac{dC}{d\theta}} - \sqrt{\frac{dC_2}{d\theta}}\right)$$

Material to be added at a given $\theta$ or capacity setting is represented by negative values of $\Delta\rho$, and material to be cut away below $R$ at a given $\theta$ is shown by positive values of $\Delta\rho$.

Due to the fact that it is not practicable in a manufacturing way to add material to an already formed plate of a given radius, the equivalent effect is secured by so dimensioning the condenser that there will be initially a constant average excess of area at all settings over that necessary to secure the desired capacity curve. Thus, in Fig. 4, which we may now take to represent schematically a condenser rotor blade pivoting at $O$, the condenser will have been so dimensioned that the desired capacity curve $C$, Fig. 3, would, if there were no irregularities in manufacture, be obtained by cutting away from the condenser blade originally bounded by the arc $R_3$ (which arc is equal to the diameter of the other blades of the condenser) a zonal portion limited by the arc $R$.

Figure 1:
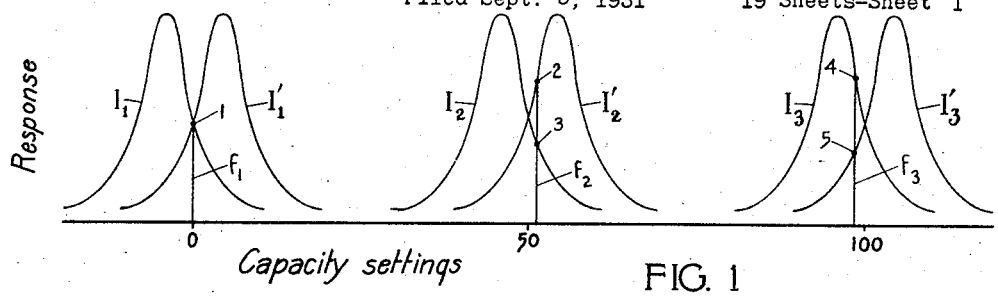
Fig. 1 is a diagram showing resonance curves of two receptor circuits taken at three points of parallel capacity setting, and illustrates the manner in which the value of the response of these two circuits to a detected signal varies with the frequency relation of the detected signal to the resonance curves of the receptor circuits.

The outer zone $Z_1$ may therefore be said to represent material that is available to be added to produce a certain positive correcting effect, while the inner zone $Z$ represents material that may be subtracted to obtain a certain negative correcting effect. The total width of the zones $Z$ and $Z_1$, which is equal to the "throw" of the cutting tool, is made to be such as to provide for the correction of the greatest aberration from the desired capacity that ever occurs in a normal run of condensers of a given design and manufacture, the position of the arc $R$ representing the normal radius of the blade,—which radius is less than the radius of the other blades of the condenser by the distance $r$. The shape of the blade after it had been reformed to secure a corrected capacity curve, corresponding to curve $C$ of Fig. 1, is shown by the line $R_2$, which represents the outer edge of the reformed blade. The depth of cut from the outer edge $R_3$ of the original blade will be equal at any $\theta$ to $\Delta\rho + r$, $\Delta\rho$ being in some cases positive and in some cases negative, as above explained.

The above result applies to the case of a condenser of any number of plates if all of the plates are cut to the required form. However, in the method of correction herein described, only one plate of the multiple-plate condenser is modified in shape to correct capacity aberrations. This method of working has the advantage that the magnitude of correction as expressed in deviations from $R$ is multiplied by the number of plates in the condenser, thus allowing the correction plate being cut more exactly to the required form.

The curve $R_3$ of Fig. 4 must therefore be modified, and we have as values of $\Delta\rho'$ in a condenser of any number of plates when only one plate is reformed:

For corrections exterior to $R$, $$\Delta\rho' = \pm \sqrt{n\Delta\rho(\Delta\rho + 2\rho) + \rho^2} - \rho$$

For corrections within $R$, $$\Delta\rho' = \pm \sqrt{n\Delta\rho(\Delta\rho - 2\rho) + \rho^2} + \rho$$

where $n$ is the number of plates of the condenser.

Although a method of arriving at the form of the correction curve has been described above, it will be understood that in the process of correcting the condenser capacity characteristic this curve is not determined by any mathematical process before the blade is cut, but is automatically formed on the blade by the normal working of the machine, (which performs the function of an automatic differentiator) in the operation of reforming the condenser blade.

The general principle on which the machine operates is the following: The condenser to be corrected is included in an oscillating circuit and furnishes the means for varying the frequency of this circuit. The frequency of the oscillations generated at increasing capacity settings are automatically compared with the natural frequency of a suitable receptor circuit which has been carefully calibrated and standardized to respond to a frequency which bears some definite relation to the frequency of the oscillating circuit, if the condenser in this circuit possesses the desired capacity characteristic. Departures from the correct capacity characteristic, and consequently of the generated frequency as detected by the receptor circuit, are employed to actuate mechanism which results in a greater or smaller amount of material being removed at different angular positions of the condenser rotor to give the correct capacity at all settings. The rotor of the condenser to be corrected is during the operation of correction turned through positions of increasing overlap, the cutting process being practiced at the entering edge of the rotor and proceeding from the position of least overlap to the position of greatest overlap. Corrections which have been already performed on the blade are thus automatically integrated, the correction at the capacity setting where the cutting is being performed being equal to the difference between the integrated positive and negative quantities of correction already made and the correction required at that setting.

Figure 6:
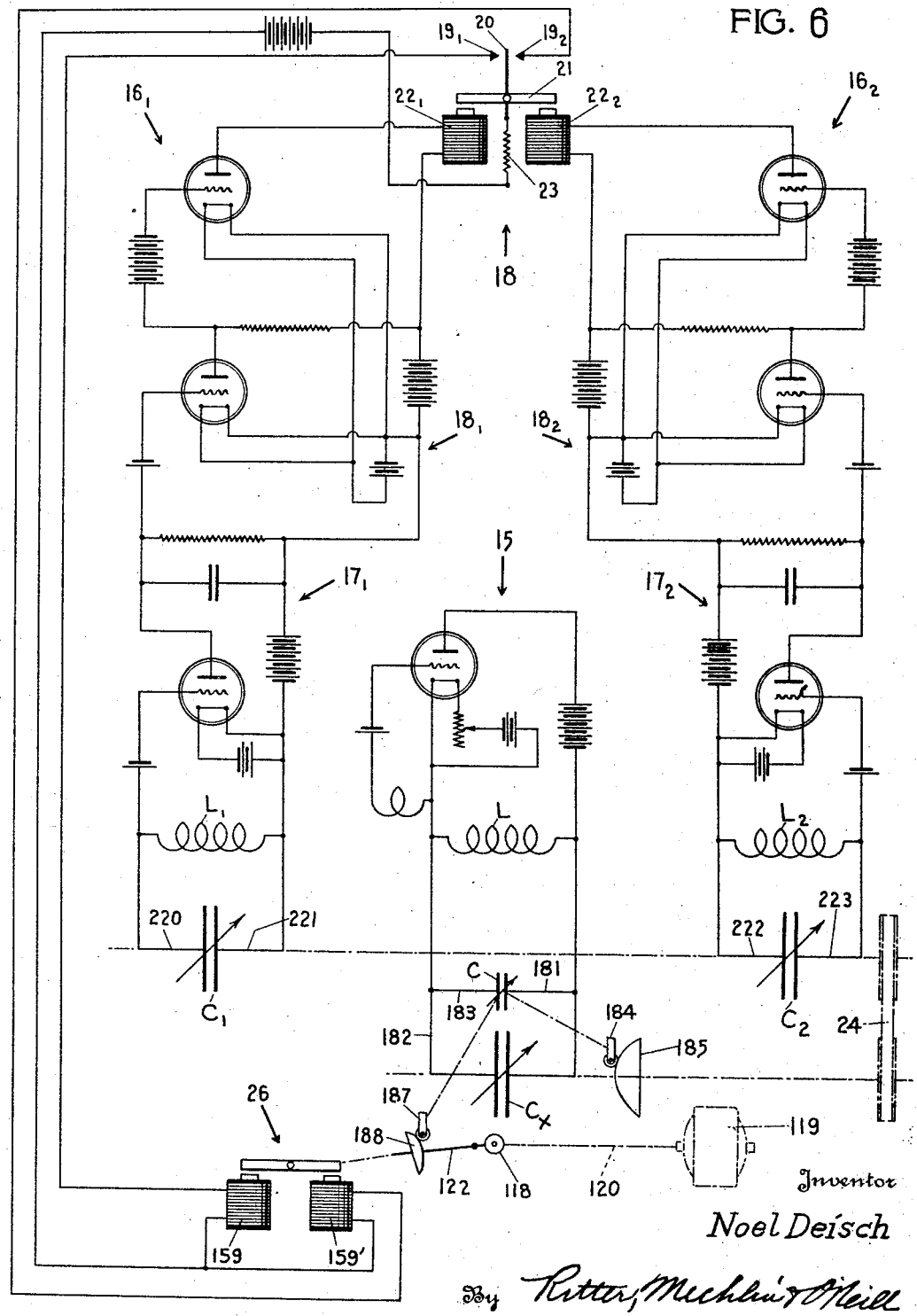
Fig. 6 is a wiring diagram showing the preferred arrangement of an oscillation generating circuit and two receptor circuits controlling relay apparatus as used in carrying out the invention.

The preferred circuit arrangement is shown in Fig. 6, this being the circuit shown as incorporated in the cutting machine presently to be described in detail. The condenser to be corrected is here shown at $C_x$ and its associated oscillating circuit at 15, the type of oscillating circuit actually used being of little importance except that it must be stable in operation and produce an output of good wave form. The receptor circuits shown at $16_1$ and $16_2$ are identical, each comprising the detecting and amplifying component circuit $17_1$ and $17_2$, the resistance-repeating amplifying component circuit $18_1$ and $18_2$ and containing the calibrated tuning condensers $C_1$ and $C_2$. The condensers $C_1$, $C_x$, and $C_2$ are mechanically coupled as shown at 24, so that all of the variable condensers of the three circuits partake of equal angular movement normally producing substantially equal changes of capacity. The receptor circuits $16_1$ and $16_2$ include the inductances $L_1$ and $L_2$ which are loosely coupled with the inductance L of the oscillating circuit 15. The coupling of the coils $L_1$ and $L_2$ with the coil L is so adjusted that at any setting of the condensers the value of the response in circuits $16_1$ and $16_2$ is equal. The output of the final stage of the circuits $16_1$ and $16_2$ passes through the windings of the electromagnets $22_1$ and $22_2$, respectively, of the differential relay 18,—the armature 21 and the contact arm 20 of which are normally held in the neutral position shown in the figure by the centering spring 23, which also serves as a conducting connection to the contact arm 20. It will be noted that the contact arm 20 normally, that is, when the currents flowing in the electromagnets $22_1$ and $22_2$ are equal, rests in a position between the contact points $19_1$ and $19_2$. Any inequality in the current flowing in the electromagnets $22_1$ and $22_2$ closes the circuit to one or the other of the electromagnets 159 and 159′, which are part of an electromechanical relay acting to modify the position of a cutting wheel 118 in a manner presently to be described.

The controlling action of the receptor circuits will become clear by an inspection of Fig. 1, which shows the natural resonance curves $I_1$, $I'_1$; $I_2$, $I'_2$; and $I_3$, $I'_3$ of the circuits $16_1$ and $16_2$ respectively, at three different settings of the condensers $C_1$ and $C_2$. The frequency which may be produced by the oscillation generator circuit 15 at corresponding settings of the condenser $C_x$ is shown at $f_1$, $f_2$, and $f_3$. It will be seen that the natural frequencies of the circuits $16_1$ and $16_2$ are such that their resonance curves I and I′ overlap, cutting each other at a median value. These response curves preserve this relation throughout all settings of the condensers, moving down the frequency scale at parallel positions as the overlap of the condensers is increased, as shown in Fig. 1. When the capacity of the condenser $C_x$ under correction coincides with the desired capacity at a given setting, the frequency of the oscillating circuit corresponds with the point of intersection 1 of the resonance curves $I_1$ and $I_2$. The two circuits $16_1$ and $16_2$ hence give equal response, and equal currents flow in the electromagnets $22_1$ and $22_2$ of the relay 18, (material being removed from the blade of the condenser $C_x$ by the cutter 10 to the depth R of Fig. 4.)

If, however, there be an excess of capacity in the condenser $C_x$, a lower frequency is produced in the oscillator 15, as shown at $f_2$ in Fig. 1. the value of the response in the circuits $16_1$ and $16_2$ corresponds respectively to the ordinates 3 and 2 of $I_2$ and $I_2$, the contact arm 20 of the relay 18 makes contact with the contact point $19_2$, and the electromechanical relay moves to change the position of the cutter 118, so that material is removed from the entering edge of the condenser $C_x$ to correct its capacity. If, on the other hand, there be a deficiency of capacity in the condenser $C_x$, a frequency higher than the correct frequency is produced in the oscillator 15, as shown at $f_3$ of Fig. 1, the circuits $16_1$ and $16_2$ are affected in the ratio of the ordinates 4 and 5 respectively of $I_3$ and $I'_3$, the contact arm 20 makes contact with the contact point $19_1$ and the relays 18 and 26 act to cause an amount of material to be removed from the condenser blade at this point sufficient to produce the required capacity compensation.

It is, of course, not necessary to use the type of receptor circuits shown in Fig. 6. Thus, in Fig. 7, inductively repeating receptor circuits $35_1$ and $35_2$ tuned by condensers $C_3$ and $C_4$ are shown. The controlling action of these circuits is substantially the same as that of the circuits above described.

Figure 2:
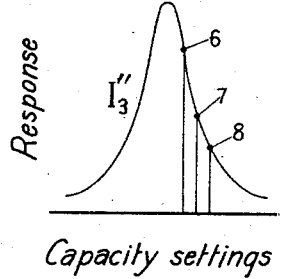
Fig. 2 is a resonance diagram of a receptor circuit and shows the value of the response to a signal at three different frequencies.
Figure 8:
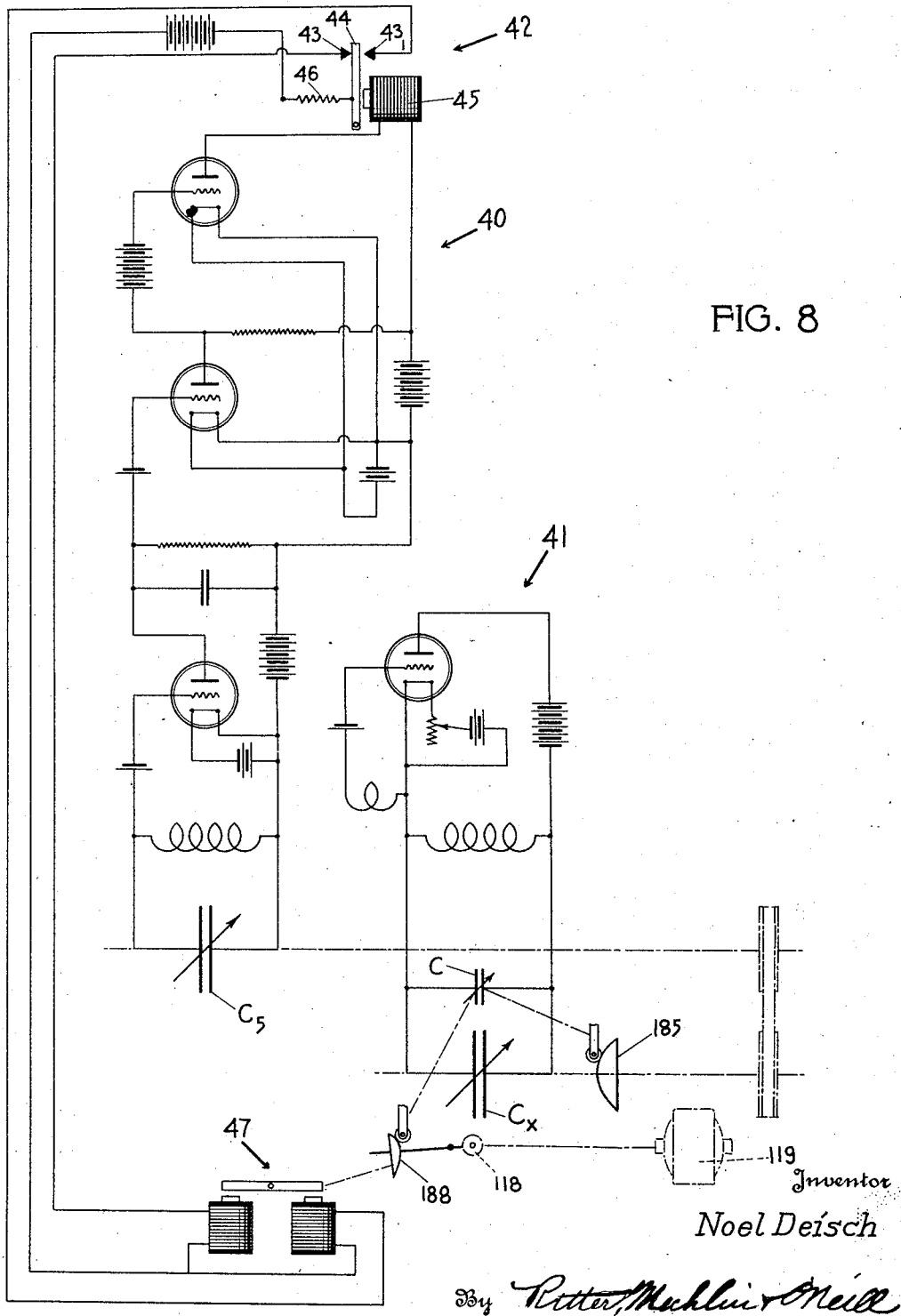
Fig. 8 is a diagram showing a modified circuit arrangement comprising an oscillation generator and a single receptor circuit controlling relay apparatus, such as may be used in carrying out the invention.

It is also possible to use merely one receptor circuit, as shown in Fig. 8, where a circuit 40 similar to either one of the circuits $16_1$ or $16_2$ of Fig. 6 and tuned by the condenser $C_5$ is diagrammed. The resonance curve of this circuit may be represented as in Fig. 2. The frequency produced by the oscillator circuit 41 normally intersects the resonance curve of the circuit 40 at a median point 7. Any deviation from correct capacity in condenser $C_x$ results in a displacement of the frequency with respect to the response curve $I''_3$, and the response in the receiving circuit 40 represented by the ordinates of the points 6 and 8 varies in sympathy with this displacement, causing a change of current flow in the electromagnet 45 of the relay 42. If this current exceeds a certain value, the armature 44 of the relay 42 makes contact with the contact point $43_1$, and actuates the electromechanical relay 47 in a given sense to make a given correction. If the current is less than a certain value, the spring 46 of the relay 42 draws the armature 44 back into contact with the contact point 43 and the electromechanical relay 47 is operated in the reverse sense to make a different correction.

Figure 7:
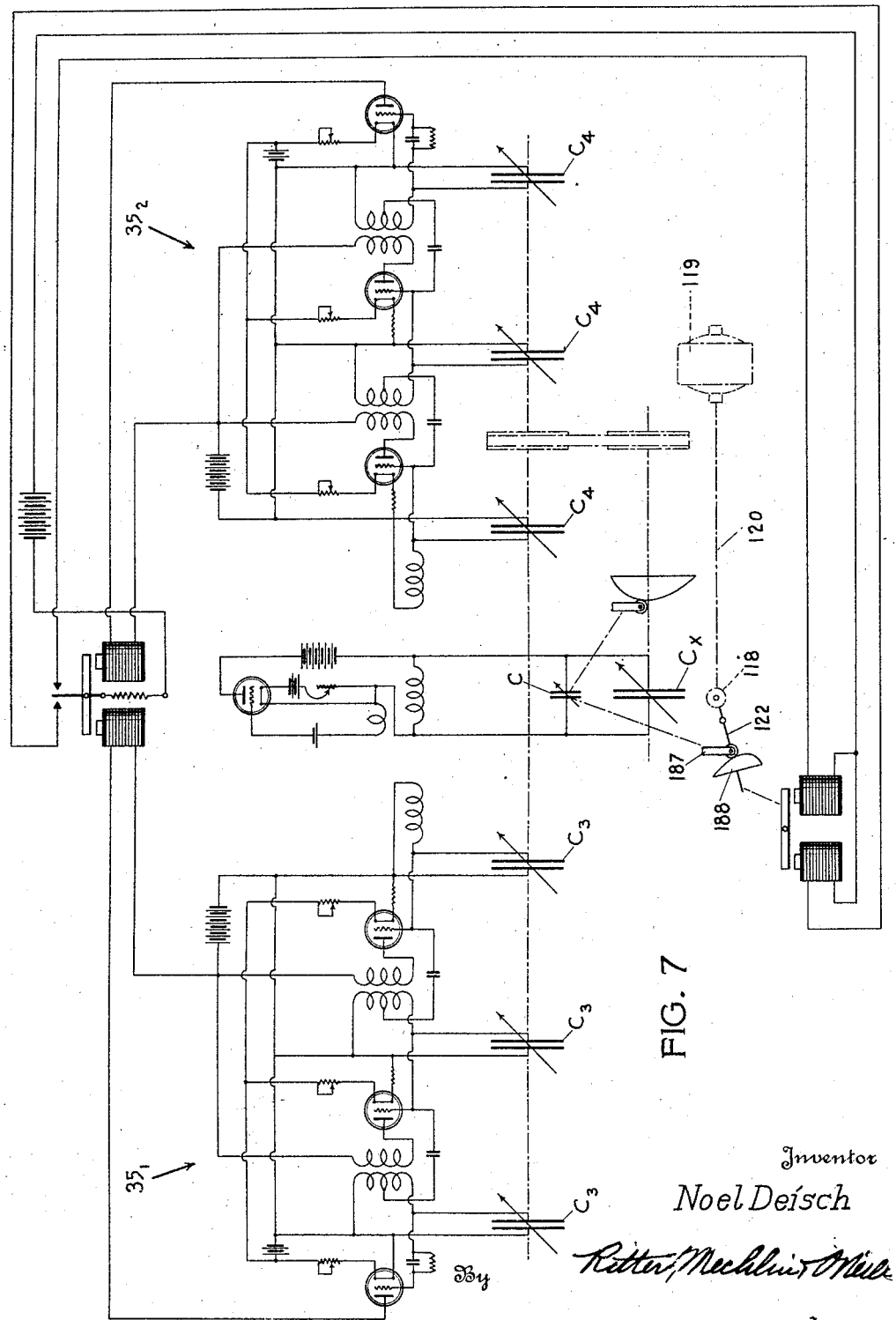
Fig. 7 is a diagram of apparatus similar to Fig. 6 but including receptor circuits of a different type.

The advantage of using the double form of receptor circuit shown in Figs. 6 and 7 as compared with the single receptor circuit shown in Fig. 8 lies chiefly in the fact that the changes in the response curves $I_1$ and $I_2$ caused by such influences as the gradual exhaustion of the various circuit batteries, and changes in output of these batteries due to temperature effects and the like, may be made of equal value in the two circuits and hence caused to balance out.

Figure 5:
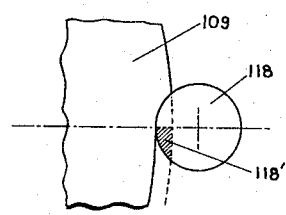
Fig. 5 is a diagram showing a cutting wheel in the process of reshaping a condenser blade, and illustrates the influence of the depth of cut of the wheel in spuriously modifying the capacity of the condenser.

The immediate correctional instrument described in the present disclosure comprises a cutting wheel 118, which is brought to bear against the entering edge of a rotor blade 109, as indicated in Fig. 5. In the operation of trimming the rotor blade, this cutter is brought into apposition with the complementary stator blade and hence causes a certain disturbance of capacity in the condenser undergoing correction. It will be noted that two oppositely acting effects are involved, (1) the capacity added due to the proximity of the cutter to the stator blade, and (2) the masking effect of the cutter, indicated by the shaded portion 118', by which the capacity subtracting action of the corresponding cut off portion of the blade 109 is obliterated. These effects are proportional to some function of the depth of the cut, the character of the function being determined by the forms and dimensions of the cutter and of the condenser.

To compensate this disturbing capacity effect of the cutter 118, an auxiliary condenser C, Fig. 6, acting in parallel with the condenser $C_x$ under correction is included in the oscillating circuit 15. A cam 188 mechanically coupled with the cutter 118 is made to vary the capacity of the condenser C according to the movement of the cutter arm 122, the shape of the cam being such that the disturbing capacity effect of the cutter is exactly counterbalanced; that is to say, for each portion of capacity added or subtracted by the cutter, a like unit of capacity is coincidentally subtracted or added to the condenser C, whereby the capacity of the oscillating circuit 15 is rendered independent of the capacity disturbing action of the cutter. The capacitive environment of the condenser $C_x$ in the correcting machine may be different from its capacity environment in its final placement, as in a radio set, with the result that a condenser made to have the required capacity curve in the plate reforming machine would show aberrations in actual use. To correct this effect, the cam 185, Fig. 6, which is mechanically coupled to the actuating shaft of the condenser C and acts to vary the capacity of this condenser, is provided. The cam 185 is so shaped as to make possible the correction of errors which may occur in any setting of the condenser $C_x$.

It may be noted, at this point, that the cam 185 may be made to provide any desired characteristic in the condenser $C_x$, within the limits of the machine. A non-linear characteristic or a characteristic not following any simple law may be desirable in practice. Thus, for example, it is well known that, at high frequencies, the effective value of inductance in coils is not the same at all frequencies, and, due to this and analogous causes, there may exist unevenness of spacing of frequencies in radio circuits, that is certain frequencies may be displaced with relation to contiguous frequencies at certain capacity settings. These displacements occur in substantially the same position and in substantially equal degree for the various members of a given series of radio sets made by production methods. To cause the frequency of such a circuit to follow regularly a simple law, it may be desirable to modify the form of the condenser characteristic so as to compensate the frequency characteristics produced by the irregular action of the inductances. Such a special form in the desired condenser curve may be provided by suitably modifying the form of the cam 185. A coordinate result may also be attained by employing condensers $C_1$ and $C_2$ having characteristics of the desired form.

The apparatus for effecting the correction of variable condensers includes a suitable frame supported on a cabinet or stand, which may also contain the batteries to furnish the necessary current, as more or less conventionally illustrated in Figs. 9 and 9A. Generally speaking, the mechanism comprises means for positioning and clamping the condensers in position within the frame, a prime mover, such as an electric motor, a cutting wheel driven thereby, an adjustable lever for swinging the cutter toward and from the work, a reversible drive mechanism adapted to be connected to the lever by manual means, electromagnets controlling said drive, an oscillating circuit in which the condenser to be corrected is included as the means for varying the frequencies of said circuit, one or more receptor circuits inductively coupled to said oscillating circuit and containing standardized condensers, a relay circuit responsive to current changes in the receptor circuit or circuits to selectively energize the magnets controlling the reversible drive mechanism, gearing connections with the motor for effecting coordinate movements of the rotors of the condenser undergoing correction and of the condenser or condensers in the receptor circuit or circuits, an auxiliary condenser in the oscillating circuit comprising movable members actuated by adjustable cams which are operated by the cutter operating lever and the rotor drive respectively, together with the necessary ancillary means for effecting the starting and stopping of various operating devices and establishing the electric connections between the condenser undergoing correction and the oscillating circuit, all as will be more particularly pointed out hereinafter.

Condenser

Figures 12, 13:
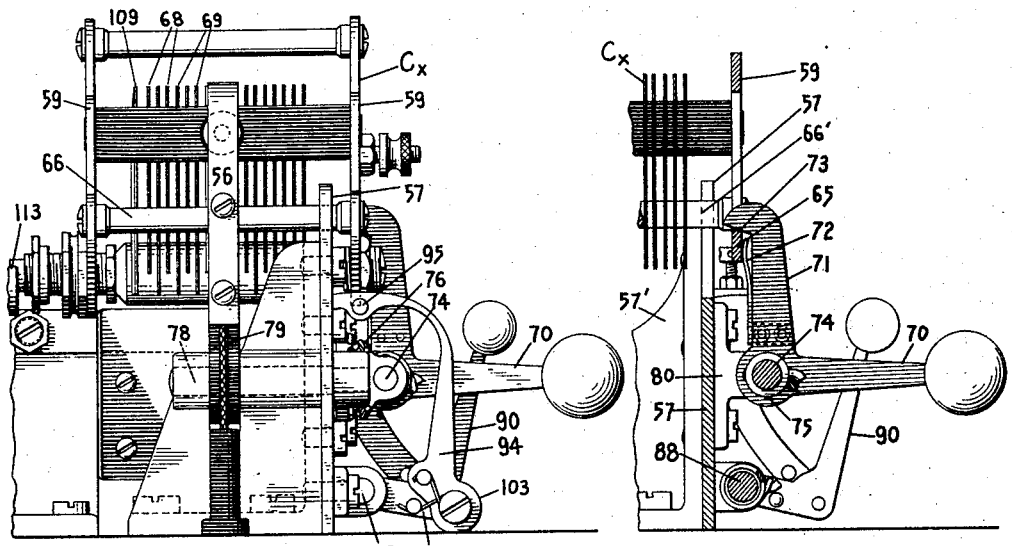
Fig. 12 is a fragmentary side elevational view showing the condenser in place, and illustrates especially the mechanism for supporting, aligning, and clamping the condenser, and for moving the rotor to the proper initial position.
Fig. 13 is a fragmentary section taken on the line 13—13 of Fig. 11, and shows especially the means by which the condenser is clamped into place.

While the machine may be readily adapted for operating on any of the standard types of adjustable condensers involving a rotor, the machine, as illustrated, is intended to receive and correct condensers having somewhat specialized structural features, as indicated in Figs. 11, 12 and 19, which show the end frame members 59 of the condenser as of a form to expose the upper edges of the condenser blades, when the condenser is properly positioned within the machine to permit the cutting wheel to engage the rotor blade and also to permit proper engagement of the lever 71 and the rotor adjusting claws 102 and 106, to be hereinafter explained. The blade 109 (Figs. 12 and 19) on which the cutting operation is performed, is preferably placed at a greater distance from the adjacent stator blade than the other rotor blades. This permits the location of the cutter wheel, when in operation, at a convenient distance from said adjacent stator blades, which results in smaller capacity disturbances, due to the presence of the cutter wheel. Increasing this distance also has the effect of making it necessary to remove a larger area of material from the blade to achieve a given correction, thus permitting a closer control of the cutting operation. Moreover, this augmented distance minimizes the second-order effects due to lack of plane-parallelism as respects the corrected blade and the adjacent stator blade. The blade 109 is also made thicker in its body portion than the other blades to provide stability and thinner in its edge portion to facilitate the trimming action of the cutter wheel. Preferably the blade is made of a material which lends itself to ready and accurate trimming, such as soft brass, or an alloy of zinc, tin, copper and aluminum generally employed in die casting, or metallic magnesium or magnesium alloy.

Condenser aligning and clamping mechanism

As illustrated in the drawings, the condenser is adapted to be supported in the machine in inverted position with the rotor approximately in the position of greatest overlap, the cross rods or spacers 66, 66' resting on flat shoulders 58 and 59 of the end frame 57, which is secured to the top of the table or cabinet, and the rotor shaft engaging the trough-shaped end 64 of a coupling member 62 fast to a driven shaft 200, journaled in brackets forming parts of the machine frame, as shown in Fig. 19, so that, when the condenser is finally positioned in the trimming machine, the rotor shaft will be in proper relation to be locked to the coupling 62 by a set screw 117. As initially applied and as ultimately secured within the trimming machine, the condenser is supported at three points.

Figure 10:
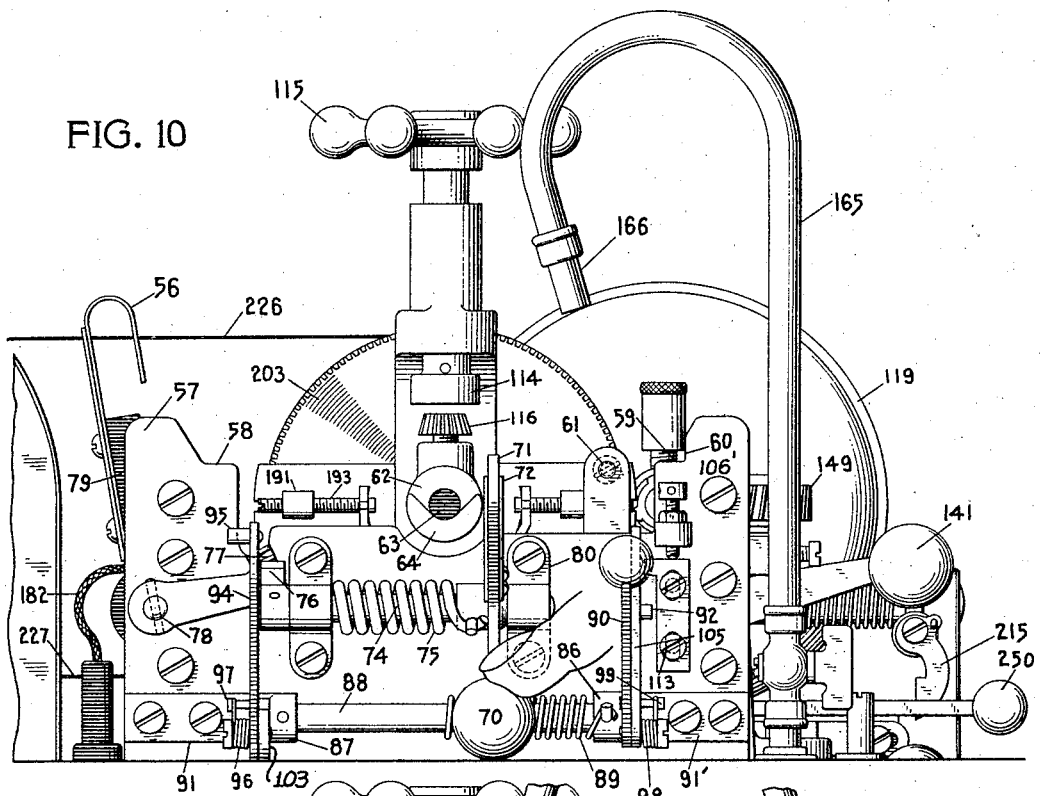
Fig. 10 is a fragmentary front elevational view showing particularly the mechanism for securing in place the condenser whose blade is to be reshaped, the parts being in the position which they assume just prior to the placing of the condenser in the machine.

Lateral and longitudinal alignment of the condenser in the machine is secured by the following mechanism: A shaft 74 journaled in brackets 80 secured to face plate 57 has secured to one end a clamping lever 71 provided with a laterally extending handle 70, as shown in Fig. 13. A helical spring 75 mounted on the shaft 74 normally tends to move the shaft 74 to cause the lever 71 to swing into clamping position as indicated in Fig. 13. Shaft 74 also has secured at one end a segmental gear 76, which mates with a segmental gear 77 pinned to a countershaft 78 journaled in a bearing formed in the end frame 57, to which shaft 78 is secured an insulating arm 79, which carries a contact spring 56 adapted to engage the binding post 67 of the condenser, as indicated in Fig. 11. When the handle 70 of the clamping lever 71 is depressed into the position as shown in Figs. 10, 16 and 18, the clamping lever and also the spring contact 56 are moved outwardly permitting the condenser to be placed in position, with one end of the condenser shaft 113 engaging the extension of the coupling 62 and the spacer rods 66 and 66' resting on the supports 58 and 59 of the end plate. When the handle 70 of the clamping lever 71 is released, spring 75 causes said lever 71 to swing into clamping engagement with the cross bar 65 of the condenser frame, as shown in Figs. 11 and 13, and at the same time the contact spring 56 is moved into engagement with the condenser binding post 67, exerting lateral pressure on the condenser and forcing it over until the spacer rod 66' engages abutment 60. These operations bring the condenser into correct lateral alignment. Simultaneously, a flat spring 72 secured to the lever 71 engages the forward frame of the condenser, forces the condenser inwardly until the rear frame of the condenser comes in contact with an adjustable stop 61, as shown in Figs. 10, 16 and 18. This brings the condenser into correct longitudinal alignment. Further movement of the clamping lever 71 forces the inclined end 73 into wedging engagement with the frame member 65 of the condenser, thus securely locking it in position. As hereinbefore stated, the spring 72 forces the condenser inwardly until the end of the shaft 113 thereof enters the coupling 62, where it is clamped into position by means of a set screw 117, which is adapted to be operated by a clutch member 114 carried by a spring retracted spindle 115', which is provided with an operating hand wheel 115 at its upper end, the clutch member 114 engaging the toothed or serrated head 116 of the set screw. The engagement of the spring 56 with the binding post 67 of the stator serves to connect the latter with the oscillating circuit 15. Contact with the rotor is made through end plate 57, which, in turn, is connected with the condenser by bolt 111 and lead 112, Figs. 17, 20 and 22.

Condenser rotor placing mechanism

After the condenser has been clamped in place, as hereinbefore described, the rotor is brought into correct relation with the stator and with the rotors of the condensers $C_1$ and $C_2$ by means of the following mechanism: The shaft 88, Figs. 10 and 15, is journaled in brackets 91, 91' and has secured at its respective ends arms 86 and 87, the former being provided with an operating handle 90. Pivoted to the arm 90 is a lever 105 and pivoted to the opposite arm 87 is a lever 94. Both of these levers are normally held in a given relation to the arms 86 and 87 by springs 96 and 98 and stop pins 97 and 99, as shown in Figs. 10 and 11. The shaft 88 is constrained to turn into the off position shown in Figs. 10, 14a and 15a by the spring 89, movement beyond the position shown in Figs. 10 and 12 being prevented by the end 103 of the arm 87 coming in contact with the top of the supporting table. The lever 105, Figs. 15a, 15b and 15c, has formed thereon a tongue 108, which passes through a guide slot 107 in the face plate 57, and also carries a stop pin 92 and a stop claw 106. On moving the lever 90 toward the face plate, as shown in Figs. 15b and 15c, the lever 105 is first brought over against the face plate 57, in which position the stop claw 106 has been moved inwardly beyond the plane of the end rotor blade 69a, and the further movement of the lever 90 lifts the lever 105 until the upper flat portion of the stop claw 106 is brought into alignment with the plane marking the straight edges of the rotor leaves 68. This position is assured by the stop pin 92 coming into contact with the stop 93, as shown in Fig. 11, the height of the stop being adjustable by means of set screw 106' and clamping screws 113.

During the above operation, the lifting lever 94, Figs. 14a, 14b and 14c, is first brought into the position shown in Fig. 14b, further movement being prevented by the pin 95 coming in contact with the end plate 57. In this position, the lifting claw 102 is brought into vertical alignment with the end rotor blade 69a. Further movement of the lever 90 into the position shown in Fig. 14c raises the lever 94 vertically, the claw 102 engaging the rotor blade 69a and turning the rotor until the diametrically opposite end of the rotor blade comes into contact with the stop claw 106 of the lever 105. The lever 94 is pivoted farther out on the arm 87 than is the corresponding lever 105 on the arm 86, hence the lever 94 is raised a greater vertical distance than is the lever 105, and, at the point where the lever 105 is arrested by the stop 93, exerts a substantial turning movement on the rotor blade 69a, the lever 94, which is of springy material, is made into the form of a loop, as shown at 100, so that its engaging end 102 may spring downwardly somewhat.

It will thus be seen that lateral movement of the lever 90 suffices to bring the rotor exactly into the required initial position, when the lever is held by the operator in the position shown in Fig. 15c until the rotor shaft is clamped in the coupling 63 by the set screw 117.

Cutting wheel

The cutting wheel 118, which may be either an abrasive disk or a milling cutter with fine teeth, is mounted on a shaft 121 connected by a universal joint to the shaft 120 of motor 119. As indicated in Figs. 20 and 21, the shaft section or mandrel 121, to which the cutter is attached, is journaled in the upper end of a lever 122 which is pivoted to the machine frame at 123. The lower end of this lever is provided with a toothed gear segment 135, the teeth of which are adapted to be engaged by a worm 124 fixed to a shaft 131, to be hereinafter fully described. The lever 122 is normally moved into position to hold the cutting wheel out of engagement with the condenser blade by a spring 125 and a buffer spring or stop 126 is provided to arrest the movement of said lever, when the latter is released. The pivot pin, upon which the lever 122 is mounted, is held in a yoke 128, Fig. 16, which is clamped in place by a plate 129 attached to the bracket 57', said yoke being adjusted laterally by means of screws 130.

Cutting wheel lever setting mechanism

As stated, the worm 124 is secured to shaft 131, the latter having secured, at its opposite end, a pulley 134 driven by a belt 134' passing over belt tightener 135, which belt is driven by a reversible friction drive connected by gearing with the motor 119, the friction drive being controlled by electromagnetic means to be hereinafter described. The shaft 131 is journaled in bearings on the rocker arm 132, which is pinned to the shaft 136 journaled in the frame 133. Limited movement of the rocker arm 132 causes the worm 124 to be brought into or out of engagement with the teeth on the segmental gear 135 of the cutter lever 122.

Pivoted to the rocker arm shaft 156 and substantially parallel with the rocker arm 132 is the rocker operating arm 137, which is provided with a slot 138 through which passes a stop screw 139, which is threaded into the rocker arm 132, so that the rocker operating arm 137 may move through the length of the slot with relation to the rocker arm 132. A spring 140 holds the rocker arm and the rocker operating arm in parallel relation, as indicated in Figs. 22 and 23, the stop screw 139 being then at the bottom of the slot 138.

The worm 124 is brought into engagement with the teeth of the cutter arm 122 by depressing the end of lever 141, which connects with the rocker operating arm 137 through link 142. The rocker operating arm is thus moved upward until its end 143 engages in the notch 144 of the release lever 145, which is secured to shaft 241 mounted in a bracket secured to the under face of the table. If it should happen that the teeth of the worm 128 and the teeth of the segmental gear 135 on the cutter arm are not in proper relation for engagement, when lever 141 is depressed, the rocker arm 132 remains stationary and, as soon as the worm is turned, the teeth fall into engagement, the spring 140 exerting a turning movement on the arm 146 of the rocker arm 132 to effect this result, the relation of the parts being shown in Figs. 22 and 23. If the release arm or lever 145 be moved outwardly in the direction of the arrow, as indicated in Fig. 22, the arms 132 and 137 will be moved downwardly by the action of the spring 147 attached to operating lever 141, and the worm 124 will be moved out of engagement with the segmental gear on the cutter arm, the position of the parts being illustrated in Fig. 20.

The release arm 145 is, as stated, mounted on a shaft 241 and a spring 242 attached to the arm tends to move the lower end of said release arm into engagement with the rocker operating arm 137. An upwardly and laterally extending arm 243 is connected to the release arm 145, as shown in Fig. 19, and has its upper end positioned to be engaged by release pin 217 carried by the cam face plate 192, to be hereinafter described. This pin, at one point in the operation of the machine, pushes the upper end of the extension arm 243 over and trips the rocker operating arm 137.

*Electromechanical relay*

The shaft 120 of motor 119 has secured thereto a worm 148, which drives a worm gear 149 fast on a vertical shaft 150, to the lower end of which is secured a friction driving disk 151, said shaft being journaled in brackets 152 and 152', respectively. The bracket 152, which is secured to the under surface of the table, has pivoted to it by a pintle 153 a rocker arm 154, said rocker arm having lateral arms in the outer ends of which is journaled a shaft 155, which has secured to its opposite ends friction wheels 156, which are normally held out of engagement with the friction disk 151 and are disposed on opposite sides of the center of the latter. A driving pulley 157 is pinned to the shaft 155 and drives, through the belt 134', pulley 134 on shaft 131 of the cutter arm operating worm 124. It will thus be seen that swinging the rocker arm 154 in either direction a slight distance causes one or the other of the friction wheels 156 to come into contact with the driving disk 151 and, therefore, drives shaft 155 and ultimately shaft 131 in one direction or the other. The rock lever 154 has attached to its opposite ends armatures 158, 158', which cooperate with electromagnets 159, 159', which are included in the relay circuit controlled by the receptor circuit or circuits, said electromagnet serving to rock the lever 154 and its attached elements into one or the other of their operating positions. The centering device, consisting of the spring 160 attached to the rock lever 154, engaging pins 161 slidably mounted in the ends of the rock lever and engaging the faces of the electromagnets, serves to hold the rock lever in a median position, when no current is flowing through either of the electromagnets. In this position, the friction wheels 156 are held out of engagement with the driving disk 151.

In operation, one of the electromagnets is energized, thereby attracting its armature and swinging the rock lever 154 on its axis, which moves one of the friction wheels 156 into engagement with the rotating disk 151. As explained, this causes the worm 124 to be driven in a given direction, thereby moving the cutter wheel 118 toward or from the rotor blade on which the cutting operation is being performed. If the other electromagnet is energized, the cutter is operated in the opposite sense. Thus the depth of the cut made in the peripheral edge of the rotor blade may be accurately controlled through the operation of the so-called electromechanical relay involving the electromagnets and the reversible friction drive controlled thereby.

Preferably, a blast of air is directed onto the work by the nozzle 166, Fig. 10, and forces the cuttings into a suction tube 167, whence they are discharged at some point remote from the operating parts of the machine.

*Compensating condenser and operating mechanism*

The compensating condenser C comprises two independently movable elements and is shown with its various accessories in Figs. 17, 20 to 24, 36 and 37. It comprises one plate 170, which is pinned to the shaft 171 journaled in bearings 172 and 173 in brackets fixed to the under side of the table. The other plate 174 of the condenser is secured to an insulating arm 175 fast to a sleeve 176, which is rotatably mounted on the shaft 171 and is supported at its ends in conical bearings 177 and 178, the latter of which is adjustable, as more particularly indicated in Fig. 17. The plate 170 is in electric connection with the rotor of the condenser C through lead 112, bolt 179, bracket 180 and the end plate 57, see Figs. 20 and 10, respectively, and also has connection through lead 181 with the oscillating circuit 15, as indicated in Fig. 6. The plate 174 is connected through the lead 182 and the contact 56 with the stator of the condenser $C_x$ and is also connected through lead 183 to the oscillating circuit 15.

The compensating condenser plate 170 has mechanical connection, through shaft 171 and the follower arm 184 secured thereto, with an adjustable cam 185 against which the follower arm roller is held by a spring 186. The plate 174 has mechanical connection through the sleeve 176 and the follower arm 187 with the adjustable cam 188 against which the roller of the follower arm is held by spring 189. The overlap of the condenser C is thus determined by the relative positions of the arms 184 and 187. In order that the action of the two arms may be directly additive, the plates are arranged in such angular relation that their areas half overlap when the arms are both in median position. Movement of the follower arms in opposite directions thus secures like capacity effects.

The adjustable cam 185 comprises a stiff flexible strip 190 supported in the carrier blocks 191 slidable in radial slots in plate 192 fixed to shaft 200, the carrier blocks being radially adjustable in the slots by screws 193, as indicated in Fig. 20. The central carrier block 191', which is constructed to secure the flexible strip 185 against longitudinal movement, being provided with a slot 194, Figs. 22 and 42, which receives a tongue 195 on the strip 190. It will be seen, therefore, that the shape of the cam may be varied by changing the curvature of the flexible strip 190. This assembly, constituting the adjusting cam, also serves as a counterweight to the rotor of the condenser $C_x$, which is being operated upon.

The adjustable cam 188 consists of a stiff flexible strip 260, which has lateral ears bent over to form bearing members for the ball ends of adjusting screws 261, see Figs. 22 to 24, which screws pass through internally threaded carriers 262, the central member 263 of the series of carriers is rigidly secured to the cutter arm 122. The other carriers are pivotally secured to the cutter arm by shoulder screws 264. The cam 260 is thus held in position at its central portion, but is allowed longitudinal freedom at the end portions and, therefore, may be adjusted to any desired curvature.

*Condenser rotor feeding mechanism*

The worm 148 on the shaft 120 of motor 119 is connected through a train of gearing, shown in Fig. 32, with feeding gear 203, which normally idles on the condenser rotor operating shaft 200, said gear being held between a sleeve 201 pinned to the shaft and a key 202 mounted in the slot in the shaft. Formed integrally with the gear 203 is a clutch member 204 having teeth adapted to mesh with complementary teeth on a clutch member 205, which is secured to the shaft 200 by a key 202, which causes the clutch member to rotate with the shaft but to be capable of longitudinal movement thereon. The clutch member 205 is moved into and out of engagement with the complementary clutch member on the gear 203 by means of a fork 206, which has a central sleeve portion 209 by means of which it is mounted on shaft 210 journaled in a bracket secured to the table top, the sleeve being connected to the shaft by a pin and slot connection 211, which allows limited movement between the sleeve and the shaft. The spring 212, connected to the shaft 210 and the fork 206, normally tends to force the clutch member 205 into engagement with the cooperating clutch member 204. Engagement of the clutch is effected by depressing a lever 213 mounted on shaft 210 against the tension of the spring 214, which normally tends to hold the clutch out of engaging relation. When the lever 213 is depressed, it is engaged by a catch 215 pivoted to a bracket on the table top, which holds the lever in its depressed position and the clutch in cooperative engagement until the catch is released by the release bar 216, which is pushed over by pin 217 on the cam face plate 192 at one point in the operation of the machine. If, when the lever 213 is depressed to engage the clutch, the clutch teeth on the respective members 204 and 205 are in such position as to not fall into full engagement, the sleeve 209 rotates through a small arc on the shaft 210 by reason of the pin and slot connection between these members and, after a slight turning movement of the clutch member 204, the teeth of the respective clutch members fall into full engagement.

*Standardized condensers*

As indicated in Figs. 43 to 51, the standardized condensers $C_1$ and $C_2$ are mounted on the table top and preferably enclosed in a suitable housing. The rotors are carried on a shaft 225, which is moved in unison with the shaft 200, which operates the rotor of the condenser undergoing correction, so that the rotors of the three condensers have coordinate movements, which movements are effected by metallic belts 226 and 227, which pass over pulley 228 fast to shaft 200 and pulley 229 on shaft 225. The arrangement of the belts is shown in Fig. 47 and the mode of attachment is shown in detail in Fig. 45, the spring 230 connecting belt 226 to pulley 229 serves to keep the belts taut at all times, but the entire load or driving force is carried by belt 227, which is secured at each of its ends to respective pulleys 228 and 229 by rivets. The upper portion of the pulley 229 is left solid to constitute a counterweight to the rotors of the condensers $C_1$ and $C_2$.

A spiral spring 231, secured at one end to the rotor shaft 225 and at its other end to an anchorage on one of the condenser side plates, tends to turn the shaft in the direction shown by the arrow in Figs. 43 and 44 and is of sufficient strength, when free to operate, to turn the shafts 200 and 225 and the several elements carried thereby. A stop, consisting of a pin 232 carried by the pulley 229 and an adjustable abutment screw 233 on the frame on which the condensers $C_1$ and $C_2$ are mounted, serves to define the exact angular position in which the motion of the shaft 225 is arrested.

The condenser $C_1$ makes electric connection with circuit $17_1$ through leads 220 and 221 and similarly condenser $C_2$ is connected with its circuit $17_2$ by leads 222 and 223. Each condenser may embody means for modifying its capacity curve, such as a presetting plate 224, Fig. 53, which shows one of the rotor plates provided with radial slits whereby said plate may be bent or deformed to make the necessary corrections to facilitate standardization.

To prevent the rotating system carried by shafts 200 and 225 being brought to an abrupt stop with a consequent danger of derangement of the parts carried thereby, a retarding device, indicated generally by the reference numeral 234, is provided. This consists of a fly 235 driven by a sector gear 236, which is journaled on a stud mounted in the frame carrying the condensers $C_1$ and $C_2$, as indicated in Figs. 48 to 50. Said sector gear is provided with a slot 238 adapted to be engaged by a pin 237 carried by the pulley 229 near the end of the return movement of the shaft 225 under the influence of spring 231, the pin 237 moving the sector 236 in the direction of the arrow in Fig. 49, the particular relation of the pin and slot effecting a relatively slow movement of the fly 235 initially, but gradually accelerating as the pin approaches the pivotal axis 239 of the sector gear, so that the speed of the rotating system, consisting of the shafts 200 and 225 and their attachments, is gradually reduced. The segmental gear 236 is held in normal position by pin 240 thereon engaging the supporting frame of the condenser, the segment being returned to its position by the movement of the pin 237 out of the slot.

Pivoted at 251 to the table top is a release or trigger lever 250, which engages a pin 252 with its hook end, thereby holding the rotating system, comprising shafts 200 and 225 and the elements carried or operated thereby, in "sprung" position with the rotors of the condensers $C_x$, $C_1$ and $C_2$ in positions of greatest overlap and the spring 231, which drives said shafts when released, under tension.

Operation

The complete sequence of operations in the method of correcting the capacity curve of the condenser $C_x$ by reforming the blade 109 is as follows: Assume the machine to be in operating condition, namely, with all of the circuits active and the motor 119 running, the air jet issuing from nozzle 166 and suction applied in the duct 167, then the first operation will be to depress the lever 70, so that the rotor shaft 113 of the condenser to be corrected may be introduced into the opening 63 of the coupling 62 and, the spacer rods 66, 66' resting on the bearing portions 58 and 59 of the end plate 57, the condenser is pushed toward the machine until the rear frame member 59 comes in contact with the stop 61, whereupon lever 70 is released, bringing the condenser into alignment, making contact with the rotor binding post 67 and clamping the condenser in place. Lever 90 is then pressed toward the machine, bringing the rotor of the condenser $C_x$ into correct angular position, after which clutch handle 115 is pressed down and turned, thereby clamping the condenser rotor shaft to shaft 200, and the clutch handle is released. The trigger lever 250, which is pivoted at 251, is pulled forward, releasing the pin 252 and allowing the rotary system, consisting of the shafts 200 and 225 and the attachments connected to or operated thereby, to be actuated, the said shafts being driven by the spiral spring 231 connected to shaft 225 on which the condenser $C_1$ and $C_2$ are mounted, whereby the rotors of all of the condensers $C_x$, $C_1$ and $C_2$ are moved into zero position or the position of least overlap, in which position the pin 232 engages the stop 233. Lever 141 is depressed, thereby moving the worm 124 into operative engagement with the segmental gear 135 of the cutter arm 122, thereby causing the cutter arms to swing the rotary cutter into engagement with the edge of the rotor blade 109. This movement of the cutter arm is effected by means of the electromechanical relay comprising the magnets 159, 159' and the reversible friction drive controlled thereby, as hereinbefore explained. This preliminary operation of the cutter effects the correct capacity balance of the condenser $C_x$ at zero setting. When this preliminary cutting operation has ceased, the clutch lever 213 is depressed, thereby causing the shafts 200 and 225 to be simultaneously turned by the feed wheel 203, the work being gradually fed into the cutting wheel 118, the circuits $16_1$ and $16_2$ containing the standard condensers $C_1$ and $C_2$ responding to the frequency of the oscillating circuit 15 containing the condenser $C_x$ under correction, and causing the electromagnetic relay to vary the depth of the cut of the cutting wheel to remove the necessary metal from the rotor blade 109 to correct the capacity aberrations of the condenser.

When the cutting operation is completed and the condenser rotors are in the position of greatest overlap, the release pin 217 trips the release lever 145, the worm 124 is moved out of engagement with the segmental gear on the cutter arm 122 and the cutter arm is moved by its operating spring 125 to position of inoperativeness, as indicated in Fig. 20. A slight additional angular rotation of the shaft 225 brings the pin 217 into engagement with the trip bar 216 and springs the trip 215, whereby clutch member 205 is disengaged from the cooperating clutch member, thereby stopping the rotation of shaft 225 in a forward or operative direction and permitting the rotating system, including shafts 200 and 225, to be moved back by the spring 231 a short angular distance until the pin 252 comes in contact with and is held by the catch 253. The condenser rotor shaft is released from the coupling member 62 on the end of shaft 200 and the clamping lever 71 is swung into disengaging position, permitting the condenser to be removed.

What I claim is:

1. A machine for correcting the capacity aberrations of a condenser having plate electrodes, including means to detect a deviation from the desired capacity, and means controlled by said capacity deviation detecting means to change the shape of an electrode of said condenser to change the capacity of said condenser to correct said deviation.

2. A machine for correcting the capacity aberrations of a condenser having plate electrodes, including means to detect a deviation from the desired capacity, and means controlled by said capacity deviation detecting means to change the area of an electrode of said condenser to change the capacity of said condenser to correct said deviation.

3. A machine for correcting a capacity deviation at a given degree of overlap of variable condensers comprising overlapping plates movable into different positions of overlap, said machine including means to detect deviations from the desired capacity, and means controlled by said capacity deviation detecting means to change the area of one of said plates to change the capacity of said condenser at a given position of overlap to correct the capacity deviation of said condenser at the said position of overlap.

4. A machine for correcting the aberrations of a condenser to produce a desired capacity curve or characteristic of said condenser, comprising overlapping plates movable into different positions of overlap to change the capacity of said condenser, said machine including means to detect deviations from the desired capacity at successive positions of overlap, and means controlled by said deviation detecting means to change the area of a plate of said condenser at successive positions of overlap corresponding to the positions at which said capacity deviation determinations were made, to change the capacity of said condenser at a plurality of successive positions of overlap to correct the capacity curve of said condenser.

5. A machine for correcting the aberrations of a condenser to change the original capacity curve of said condenser into a curve of different form, said condenser comprising overlapping plates movable into different positions of overlap to change the capacity of said condenser, said machine including means to determine the capacity of said condenser at different abscissal points of said original capacity curve, and means associated with said capacity determining means to effect stable changes in the capacity of said condenser at positions of overlap corresponding to the positions at which said capacity determinations were made, to change the form of the capacity curve of said condenser.

6. A machine for correcting the aberrations of a condenser to change the original capacity curve of said condenser into a curve of different and predetermined form, said condenser comprising overlapping plates movable into different positions of overlap to change the capacity of said condenser, said machine including means to determine the capacity of said condenser at different positions of overlap corresponding to different abscissal points of said original capacity curve, means to detect a difference between said capacity determinations and the capacity reading of the desired curve at similar abscissal points, and means controlled by said difference detecting means to effect stable changes in the capacity of said condenser at positions of overlap corresponding to the positions at which said capacity determinations were made, to reform the capacity curve of the condenser.

7. A machine for correcting the aberrations of a condenser to produce a capacity curve of a given desired form, said condenser comprising plates movable into different positions of overlap to change the capacity of said condenser, said machine including a second variable condenser whose capacity curve bears a predetermined relation to the desired capacity curve, means to determine differences of capacity of said condensers at different identical positions of overlap, and means controlled by said difference determining means to effect stable changes of capacity of said first mentioned condenser at positions of overlap corresponding to the positions at which said determinations were made.

8. A machine for correcting the aberrations of a condenser to produce a capacity curve of a given desired form, said condenser comprising overlapping plates movable into different positions of overlap to change the capacity of said condenser, comprising an electric circuit including said condenser, the value of an electrical constant of said circuit varying as said plates are moved into different positions of overlap, a second electric circuit including means to vary the value of an electric constant thereof in a predetermined manner coincident with the variations in the value of a constant of said first circuit caused by moving said plates into different positions of overlap, means to detect a difference in value of the constants of said circuits at different positions of overlap, and means responsive to said difference detecting means to change the area of the overlapping portion of said condenser plates at different positions of overlap to give capacities at said positions of overlap bearing a predetermined relation to values of the constant of said second circuit at equivalent positions of overlap.

9. A machine for correcting capacity aberrations in a condenser, comprising an oscillating circuit to include the condenser, a receptor circuit coupled to the oscillating circuit and containing a standard condenser, and means controlled by the receptor circuit for cutting away zonal portions of the first condenser when the frequency of the oscillating circuit varies from that of the receptor circuit.

10. A machine for correcting capacity aberrations in a condenser, comprising an oscillating circuit to include the condenser, a receptor circuit coupled to the oscillating circuit and containing a standard condenser, and means including a cutter controlled by the receptor circuit for removing zonal portions of the first condenser when the frequency of the oscillating circuit varies from that of the receptor circuit.

11. A machine as set forth in claim 1 in which said means includes a relay circuit sponsive to current changes in the receptor circuit and an electromechanically operated cutting tool controlled by said relay circuit.

12. A machine as set forth in claim 1 in which said means includes a relay circuit responsive to current changes in the receptor circuit and a reversible electromechanically operated cutting tool controlled by said relay circuit.

13. A machine for correcting capacity aberrations in a condenser, comprising an oscillating circuit to include the condenser, a receptor circuit coupled to the oscillating circuit and containing a standard condenser, connections between said condensers to effect coordinate movements of the movable elements thereof, and means controlled by the receptor circuit for excising zonal portions of the first condenser when the frequency of the oscillating circuit varies from that of the receptor circuit.

14. A machine for correcting capacity aberations in a condenser, comprising an oscillating circuit, duplicate receptor circuits coupled to the oscillating circuit and each containing a standard condenser, a relay circuit responsive to current changes in the receptor circuits, a cutting tool for removing zonal portions of the first condenser when the frequency of the oscillating circuit varies from that of the receptor circuits, and means including an electromechanical actuator in the relay circuit for operating said cutting tool.

15. A machine for correcting capacity aberrations in a condenser, comprising an oscillating circuit to include the condenser, a receptor circuit coupled to the oscillating circuit and containing a standard condenser, means including a cutter controlled by the receptor circuit for removing zonal portions of the first condenser when the frequency of the oscillating circuit varies from that of the receptor circuit, an auxiliary condenser in parallel with the condenser to be corrected, and means for adjusting said auxiliary condenser to compensate the capacity disturbing effect of the cutter.

16. A machine for correcting capacity aberrations in a condenser, comprising an oscillating circuit to include the condenser, a receptor circuit coupled to the oscillating circuit and containng a standard condenser, means including a cutter controlled by the receptor circuit for removing zonal portions of the first condenser when the frequency of the oscillating circuit varies from that of the receptor circuit, an auxiliary condenser in parallel with the condenser to be corrected, and means for adjusting said auxiliary condenser to compensate the capacity disturbing effects of the cutter and capacity aberrations of the first condenser due to change from its correctional to its final environment.

17. A machine for correcting capacity aberrations in a condenser, comprising an oscillating circuit, duplicate receptor circuits coupled to the oscillating circuit each containng a standard condenser, a relay circuit responsive to current changes in the receptor circuits, a cutting tool for removing zonal portions of the first condenser when the frequency of the oscillating circuit varies from that of the receptor circuits, means including an electromechanical actuator in the relay circuit for operating said cutting tool, and manual means for engaging the tool with the operating means therefor.

18. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, and a relay circuit responsive to current changes in the receptor circuit controlling the effective engagement of the cutter with the rotor element.

19. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, and means operated by said motor for effecting coordinate movements of the rotor elements of said condensers during the correctional operations.

20. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, means operated by said motor for effecting coordinate movements of the rotor elements of said condensers during the correctional operations, and automatic means for reversing the movements of said rotor elements.

21. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, means operated by said motor for effecting coordinate movements of the rotor elements of said condensers during the correctional operations, an auxiliary condenser in parallel with the condenser to be corrected, and means for adjusting said auxiliary condenser to compensate the capacity disturbing effect of the cutter.

22. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, means operated by said motor for effecting coordinate movements of the rotor elements of said condensers during the correctional operations, an auxiliary condenser in parallel with the condenser to be corrected, and means for adjusting said auxiliary condenser to compensate the capacity disturbing effects of the cutter and capacity aberrations of the first condenser due to changes from its correctional to its final environment.

23. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, an electromechanical actuator in said relay circuit for effecting operative engagement of the cutter with the work, and driving connections between said actuator and the motor.

24. A machine for correcting capacity aberrations in a condenser which includes rotor and stator elements, comprising a motor, a rotary cutter operated thereby, means for securing the condenser in position to permit a rotor element to be engaged by said cutter for removing zonal portions thereof, an oscillating circuit to include said condenser, a receptor circuit coupled to said oscillating circuit and containing a standard condenser, a relay circuit responsive to current changes in the receptor circuit controlling the effective engagement of the cutter with the rotor element, a reversible electromechanical actuator in said relay circuit for effecting operative engagement of the cutter with the work, and driving connections between said actuator and the motor.

25. A machine for correcting capacity aberrations in a condenser including rotor and stator elements, comprising a tool for removing zonal portions of the rotor element, an oscillating circuit in which the condenser is included for varying the frequency of said circuit, a receptor circuit inductively coupled to said oscillating circuit and including a standard condenser, means for effecting coordinate settings of said condensers, and mechanism controlled by current variations in the receptor circuit for operating the tool to remove zonal portions of the rotor element necessary to effect the desired corrections.

26. A machine for correcting capacity aberrations in a condenser including rotor and stator elements, comprising a tool for removing zonal portions of the rotor element, an oscillating circuit in which the condenser is included for varying the frequency of said circuit, a receptor circuit conductively coupled to said oscillating circuit and including a standard condenser, means for effecting coordinate settings of said condensers, a relay circuit responsive to current changes in the receptor circuit, and means controlled by said relay circuit for engaging the tool with the work to remove zonal portions of the rotor element necessary to effect the desired corrections.

In testimony whereof I affix my signature.

NOEL DEISCH.